US006606928B2

(12) United States Patent
Takaishi et al.

(10) Patent No.: US 6,606,928 B2
(45) **Date of Patent: *Aug. 19, 2003**

(54) PUNCHING SYSTEM

(75) Inventors: Yoshiyuki Takaishi, Ebina (JP); Ryuichi Satou, Ebina (JP)

(73) Assignee: Fuji Xerox Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/496,344

(22) Filed: Feb. 2, 2000

(65) Prior Publication Data

US 2001/0049990 A1 Dec. 13, 2001

Related U.S. Application Data

(62) Division of application No. 08/815,007, filed on Mar. 14, 1997, now Pat. No. 6,065,383.

(30) Foreign Application Priority Data

Mar. 14, 1996 (JP) ............................................. 8-57816

(51) Int. Cl.[7] ............................. B26D 5/26; B26F 1/00; G03B 27/00

(52) U.S. Cl. ............................ 83/210; 83/76.8; 83/210; 83/368; 83/370

(58) Field of Search .......................... 83/365, 368, 370, 83/371, 372, 210, 211, 76.8

(56) References Cited

U.S. PATENT DOCUMENTS

| | | | | |
|---|---|---|---|---|
| 3,955,454 A | | 5/1976 | Copp | 83/368 |
| 4,061,064 A | | 12/1977 | Kindgren et al. | 83/368 |
| 4,628,578 A | | 12/1986 | Yajima | 83/371 X |
| 4,785,698 A | | 11/1988 | Stork | 83/371 X |
| 4,863,550 A | | 9/1989 | Matsuo et al. | 83/368 X |
| 5,036,574 A | | 8/1991 | Kakimoto | 83/368 X |
| 5,074,178 A | | 12/1991 | Shetley et al. | 83/371 X |
| 5,079,981 A | | 1/1992 | Singer et al. | 83/368 X |
| 5,334,126 A | | 8/1994 | Moll | 83/370 X |
| 5,586,479 A | | 12/1996 | Roy et al. | 83/371 X |
| 5,595,101 A | | 1/1997 | Yoshimatsu et al. | 83/40 |
| 5,839,336 A | * | 11/1998 | Yamauchi et al. | 83/371 X |

FOREIGN PATENT DOCUMENTS

| | | |
|---|---|---|
| JP | A-3-92299 | 4/1991 |
| JP | A-5-162919 | 6/1993 |

* cited by examiner

*Primary Examiner*—Charles Goodman
(74) *Attorney, Agent, or Firm*—Oliff & Berridge, PLC

(57) ABSTRACT

A punching mechanism has a plurality of predetermined standby positions where the punching mechanism is previously moved by move means and stands by based on size information in the width direction of a sheet material and punching execution information as to whether or not the sheet material is to be punched. The standby position corresponding to a sheet material of the maximum width that can be punched by the punching mechanism and the standby position applied when punching is not executed are set to substantially the same position.

7 Claims, 23 Drawing Sheets

PUNCHING SYSTEM

This is a Division of application Ser. No. 08/815,007 filed Mar. 14, 1997, issued as U.S. Pat. No. 6,065,383 on May 23, 2000. The entire disclosure of the prior application is hereby incorporated by reference herein in its entirety.

BACKGROUND OF THE INVENTION

1. Field of the Invention

This invention relates to a punching system used in combination with an image formation system such as an electrophotographic copier or a printer for automatically making holes in a sheet material of recording paper, etc., to or on which an image is copied or recorded.

2. Description of the Related Art

Hitherto, punching systems used in combination with an image formation system such as an electrophotographic copier or a printer have already been proposed as disclosed in Japanese Patent Laid-Open No. Hei 3-92299, Hei 5-162919, etc., for example. An image formation system according to Japanese Patent Laid-Open No. Hei 3-92299 has a punching mechanism comprising a plurality of punches movable with respect to a paper transport passage, the punching edges being placed side by side in a predetermined spacing in a width direction of recording paper, characterized by paper center detection means for detecting the width direction center of paper based on detection information of a width direction end position of paper in the proximity of a punching section of the punching mechanism and alignment means for substantially matching the width direction center of paper with the arrangement center of the punches before punching.

The punching system for once stopping and punching recording paper discharged from an external system in the transport process according to Japanese Patent Laid-Open No. Hei 5-162919 comprises a punching means driving force transmission mechanism and a rotation claw stopper driving force transmission mechanism coupled to an output shaft of a single motor, a first one-way clutch for actuating the punching means driving force transmission mechanism when the output shaft forward rotates, a second one-way clutch for actuating the rotation claw stopper driving force transmission mechanism when the output shaft reversely rotates, punching means being actuated when the punching means driving force transmission mechanism is actuated for punching holes in recording paper on a transport passage, a rotation claw stopper being actuated when the rotation claw stopper driving force transmission mechanism is actuated for rotating between a recording paper stopping position and saving position, a driven discharge roller being loosely engaged on the same axis as the rotation claw stopper on a stopper shaft for pivotally supporting the rotation claw stopper, a driving discharge roller being coupled to the rotation claw stopper driving force transmission mechanism for diving and coming in contact with the driven discharge roller on an outer peripheral surface for rotating the driven discharge roller in conjunction, a clutch being placed between a driving shaft for pivotally supporting the driving discharge roller and the stopper shaft for turning on and off transmission of a driving force from the driving shaft to the stopper shaft, clutch actuation means for turning on and off the clutch, and a control section for controlling the motor and the clutch actuation means.

However, the prior arts involve the following problems: In Japanese Patent Laid-Open Nose. Hei 3-92299 and Hei 5-162919, the punching mechanism and the punch unit are moved in a direction perpendicular to the recording paper transport direction by the alignment means, etc., in response to the width direction size of transported recording paper, whereby holes can always be punched in the substantial center portions of recording paper sheets different in width direction size. However, the paper center detection means for detecting the width direction center of paper based on detection information of a width direction end position of paper in the proximity of the punching section of the punching mechanism and the alignment means for substantially matching the width direction center of paper with the arrangement center of the punches before punching are operatively associated with each other. Thus, for recording paper which need not be punched, the paper center detection means may also detect the width direction center of paper based on detection information of the width direction end position of paper and move the punching mechanism so as to match the width direction center of paper with the arrangement center of the punches before punching; it is feared that electric power of the image formation system may be wasted or that starting the image formation operation may be delayed by the time required for moving the punching mechanism.

The punching mechanism of the punching system basically inserts recording paper between the punches and dies for receiving the punches and inserts the punches into the dies, thereby punching holes in predetermined positions of the recording paper. When the punching mechanism of the punching system is moved in response to the width direction size of the recording paper, if the punching section containing the punches and the die section are moved separately, it is feared that they may be placed out of position and the punches may come in contact with the dies, breaking the punches. Thus, the punching section and die section are mechanically coupled to each other at both end positions of the width direction where transport of recording paper is not disturbed and are moved in one piece.

By the way, in the punching system, if recording paper of a long width direction size which need not be punched is transported after recording paper of a short width direction size is punched, the end of the recording paper of a long width direction size is caught in the coupling part of the punch and die sections, causing a paper jam to occur. To circumvent this problem, if the coupling part of the punch and die sections is widened to a position where the coupling part is not caught in the recording paper of a long width direction size, the punching system is upsized, causing a new problem.

The punching system comprises the punching mechanism moved in response to the width direction size of recording paper. In an image formation system such as a copier to which the punching system is attached, sheets of recording paper varying in width direction position may be transported and punch positions vary from one sheet to another because of the variations in the width direction positions of recording paper. Thus, as described above, the punching system according to Japanese Patent Laid-Open No. Hei 3-92299 detects the width direction center of paper based on detection information of the width direction end position of paper by the paper center detection means and moves the punching mechanism by the alignment means so as to substantially match the width direction center of paper with the arrangement center of the punches before punching, thereby lessening the variations in the punch positions. However, the punching system according to Japanese Patent Laid-Open No. Hei 3-92299 uses a plurality of light emitting parts and light receiving parts placed facing each other for each of sheets different in width direction size as the detection means for detecting the width direction end position of paper, thus the detection means configuration becomes complicated and expensive, resulting in an increase in cost. Since the detection means for detecting the width direction end position of paper has the light emitting parts placed in physically discontinuous relation, the paper end positions that can be detected by the detection means are determined by the positional relationship among the light emitting parts and the paper end cannot be detected for the size between the adjacent light emitting parts or if the paper end can be detected, the detection precision lowers and a hole cannot accurately be punched In the center position of recording paper. Further, the punching system does not take any steps for a sheet skewed with respect to the recording paper transport direction and also involves a problem of worsening the punch position accuracy because of the skewed sheet.

SUMMARY OF THE INVENTION

The invention has been made in view of the above circumstances, and therefore a first object of the invention is to provide a punching system that can not only always punch holes in the centers of sheet materials of recording paper, etc., different in size, but also prevent wasting power because a punching mechanism is not moved unnecessarily for recording paper, etc., which need not be punched and prevent start of the image formation operation from being delayed by time required for moving the punching mechanism.

A second object of the invention is to provide a punching system that can prevent recording paper, etc., of a long width direction size from being caught in the coupling part of punch and die sections and a paper jam from occurring without upsizing the punching system.

A third object of the invention is to provide a punching system that can detect a width direction end position of recording paper with good accuracy and punch holes in predetermined positions of recording paper with good accuracy even if simple means is used as means for sensing a width direction end position of recording paper.

A fourth object of the invention is to provide a punching system that can prevent skew from causing punch hole position accuracy to be worsened if recording paper is skewed.

According to a first aspect of the invention, there is provided, in a punching system for punching holes in a transported sheet material comprising a punching mechanism having a plurality of punching edges disposed on a transport passage of the sheet material in a predetermined spacing in a direction orthogonal to a transport direction of the sheet material for making the punches appear on or disappear from the transport passage, thereby punching a plurality of holes in the sheet material in the predetermined spacing along a width direction of the sheet material and means for moving the punching mechanism in the direction orthogonal to the transport direction of the sheet material, the improvement wherein the punching mechanism has a plurality of predetermined standby positions where the punching mechanism is previously moved by the move means and stands by based on size information in the width direction of the sheet material and punching execution information as to whether the sheet material is to be punched, wherein the standby position corresponding to a sheet material of the maximum width that can be punched by the punching mechanism and the standby position applied when punching is not executed are set to substantially the same position.

According to a second aspect of the invention, there is provided, in a transported punching system for punching holes in a sheet material comprising a punching mechanism having a plurality of punches disposed on a transport passage of a sheet material in a predetermined spacing in a direction orthogonal to a transport direction of the sheet material for making the punches appear on or disappear from the transport passage, thereby punching a plurality of holes in the sheet material in the predetermined spacing along a width direction of the sheet material, the improvement which comprises first sensing means being disposed on the transport passage of the sheet material positioned between or at the middle of the punches for sensing an end margin in the transport direction of the sheet material transported to the punching mechanism, wherein the punching mechanism is Operated based on sensing information output from the first sensing means, thereby punching a plurality of holes at a predetermined distance from the end margin in the transport direction of the sheet material.

In a third aspect of the invention, the punching system of the first aspect further Includes first sensing means for sensing an end margin in the transport direction of the sheet material transported to the punching mechanism, wherein the punching mechanism is operated based on sensing information output from the first sensing means, thereby punching a plurality of holes at a predetermined distance from the end margin in the transport direction of the sheet material.

In a fourth aspect of the invention, in the punching system as claimed of the second or third aspect, the first sensing means is placed in the substantial center in the width direction of the sheet material.

In a fifth aspect of the invention, in the punching system of the second or third aspect, the first sensing means placed between the center of a sheet material of the maximum width that can be punched and the center of a sheet material of the minimum width that can be punched.

In a sixth aspect of the Invention, the punching system of the first aspect further includes first sensing means being disposed on the transport passage of the sheet material positioned between the punches for sensing an and margin in the transport direction of the sheet material transported to the punching mechanism, wherein the punching mechanism is operated based on sensing information output from the first sensing means, thereby punching a plurality of holes at a predetermined distance from the end margin in the transport direction of the sheet material, and wherein the first sensing means can be moved in the direction orthogonal to the transport direction of the sheet material in conjunction with the punching mechanism.

In a seventh aspect of the invention, in the punching system of the sixth aspect, the first sensing means is placed in the substantial middle of the punches.

In an eighth aspect of the invention, the punching system of any one of the aspects two to seven further includes control means for punching the sheet material so that a distance between the end margin in the transport direction of the sheet material and punch holes becomes constant based on sensing information output from the first sensing means. In a first preferred form, the time interval between the instant at which the first sensing means senses the end margin in the transport direction of the sheet material and the instant at which the punching mechanism starts punching is made constant.

In a second preferred form, the sheet material transport means is driven by a stepping motor and the number of pulses at the time interval between the instant at which the first sensing means senses the end margin in the transport direction of the sheet material and the instant at which the punching mechanism starts punching is made constant.

In a third preferred form, rotation angle sensing means for sensing the rotation angle of the sheet material transport means is provided and the rotation angle of the sheet material transport means at the time interval between the instant at which the first sensing means senses the end margin in the transport direction of the sheet material and the instant at which the punching mechanism starts punching is made constant.

In a fourth preferred embodiment, drive of the sheet material transport means is stopped after the expiration of a given time since the first sensing means sensed the end margin in the transport direction of the sheet material, thereby once stopping the sheet material and punching it in the stop state.

In a fifth preferred embodiment, the sheet material transport means is driven by a stepping motor and is stopped after a given number of pulses are output since the first sensing means sensed the end margin in the transport direction of the sheet material, thereby once stopping the sheet material and punching it in the stop state.

In a sixth preferred form, rotation angle sensing means for sensing the rotation angle of the sheet material transport means is provided and drive of the sheet material transport means is stopped after the sheet material transport means is rotated by a given rotation angle since the first sensing means sensed the end margin in the transport direction of the sheet material, thereby once stopping the sheet material and punching it in the stop state.

In a ninth aspect of the invention, in the punching system of the eighth aspect, the distance between the end margin in the transport direction of the sheet material and punch holes can be changed by changing a parameter containing any of a time interval between the instant at which the first sensing means senses the end margin in the transport direction of the sheet material and the instant at which punching in started, the number of pulses when a step motor is used to transport the sheet material, or a rotation angle of a transport shaft for transporting the sheet material in order to make the distance constant.

In a tenth aspect of the invention, the punching system of the ninth aspect further includes means for inputting distance data between the end margin in the transport direction of the sheet material and punch holes and operation means for converting the distance data input through the input means into the parameter of any of the time, the number of pulses, or the rotation angle, wherein based on the parameter of any of the time, the number of pulses, or the rotation angle, punching is started or sheet material transport means is stopped after the end margin in the transport direction of the sheet material is sensed.

According to an eleventh aspect of the invention, there is provided a punching system for punching holes in a sheet material transported comprising a punching mechanism having a plurality of punches disposed on a transport passage of a sheet material in a predetermined spacing in a width direction orthogonal to a transport direction of the sheet material for making the punches appear on or disappear from the transport passage, thereby punching a plurality of holes in the sheet material in the predetermined spacing along the width direction of the sheet material and means for moving the punching mechanism in the direction orthogonal to the transport direction of the sheet material, at least one second sensing means being disposed in the punching mechanism for sensing an and margin in the width direction of the sheet material at a predetermined distance in the width direction from the middle position of the punches, and means for moving the punching mechanism in the width direction, wherein the punching mechanism moved by the move means is stopped based on sensing information of the second sensing means for punching the sheet material transported to the punching mechanism.

In a twelfth aspect of the invention, in the punching system of the eleventh aspect, the punching mechanism has a plurality of predetermined standby positions where the punching mechanism is previously moved by the move means and stands by based on size information in the width direction of the sheet material and punching execution information as to whether the sheet material is to be punched, wherein the standby position corresponding to a sheet material of the maximum width that can be punched by the punching mechanism and the standby position applied when punching is not executed are made almost identical.

In a thirteenth aspect of the invention, in the punching system of the eleventh aspect, a plurality of the second sensing means are placed, one of which to use is selected in response to size information in the width direction of the sheet material for sensing the end margin in the width direction of the sheet material, and a move of the punching mechanism is stopped based on sensing information of the selected second sensing means for punching the sheet material under a condition determined for each sheet material.

In a fourteenth aspect of the invention, in the punching system of the eleventh aspect, only one second sensing means is placed and a time interval between the instant at which the second sensing means senses the end margin in the width direction of the sheet material and the instant at which the move means is stopped is determined in response to size information in the width direction of the sheet material for punching the sheet material under a condition determined for each sheet material.

In a fifteenth aspect of the invention, in the punching system of the eleventh aspect, a plurality of the second sensing means are placed and one of the sensing means to use and a time interval between the instant at which the second sensing means senses the end margin in the width direction of the sheet material and the instant at which the move means is stopped are determined in response to size information in the width direction of the sheet material for punching the sheet material under a condition determined for each sheet material.

In a sixteenth aspect of the invention, in the punching system of the fourteenth or fifteenth aspect, the move means is driven by a stepping motor and the number of pulses at a time interval between the instant at which the second sensing means selected among a plurality of the second sensing means or single second sensing means senses the end margin in the width direction of the sheet material and the instant at which the move means is stopped is determined in response to size information in the width direction of the sheet material for punching the sheet material under a condition determined for each sheet material.

In a seventeenth aspect of the invention, the punching system of the fourteenth or fifteenth aspect further includes means for sensing a rotation angle of the move means, wherein the rotation angle of the move means at a time interval between the instant at which the second sensing means selected among a plurality of second sensing means or single second sensing means senses the end margin in the width direction of the sheet material and the instant at which the move means is stopped is determined in response to size information in the width direction of the sheet material for punching the sheet material under a condition determined for each sheet material.

In an eighteenth aspect of the invention, in the punching system as claimed in any of the eleventh to seventeenth aspects, before receiving a first sheet material, the punching mechanism is moved to a standby position responsive to a width size of the sheet material based on size Information in the width direction of the sheet material and punching execution information, a move of the punching mechanism is started at the standby position, the move means is stopped under the determined condition, the sheet material is punched under the condition determined for each sheet material, and the punching mechanism is restored to a predetermined standby position after the punching terminates.

In a nineteenth aspect of the invention, the punching system of the eleventh aspect further includes sheet transport attitude correction means for correcting a transport attitude of the sheet material so that the front end of the sheet material becomes parallel with the direction orthogonal to the transport direction of the sheet material and first sensing means for sensing an end margin in the transport direction of the sheet material, wherein after the transport attitude of the sheet material is corrected by the sheet transport attitude correction means, the end margin in the transport direction of the sheet material is sensed by the first sensing means and the sheet material is punched.

In a twentieth aspect of the invention, the punching system of the eleventh aspect further includes second sensing means for sensing an end margin in the width direction of the sheet material transported to the punching mechanism, wherein time at which the second sensing means starts to sense is changed in response to size information of the sheet material.

In a twenty first aspect of the invention as claimed, the punching system of the eleventh aspect further includes second sensing means for sensing an end margin in the width direction of the sheet material transported to the punching mechanism, wherein if the second sensing means does not sense the end margin in the width direction of the sheet material within a given time after the second sensing means starts to sense the end margin in the width direction of the sheet material, the sheet material is not punched.

In a twenty second aspect of the invention, the punching system of the first or twelfth aspect further includes third sensing means for at least sensing a standby position corresponding to a sheet material of the maximum width that can be punched, wherein if the third sensing means does not sense the punching mechanism, punching is inhibited and a mode in which the sheet material passes through the transport passage of the punching mechanism is also inhibited.

The above and other objects and features of the present invention will be more apparent from the following description taken in conjunction with the accompanying drawings.

DETAILED DESCRIPTION OF THE PREFERRED EMBODIMENTS

Referring now to the accompanying drawings, a description will be made in more detail of preferred embodiments of the invention.

Figure 11:
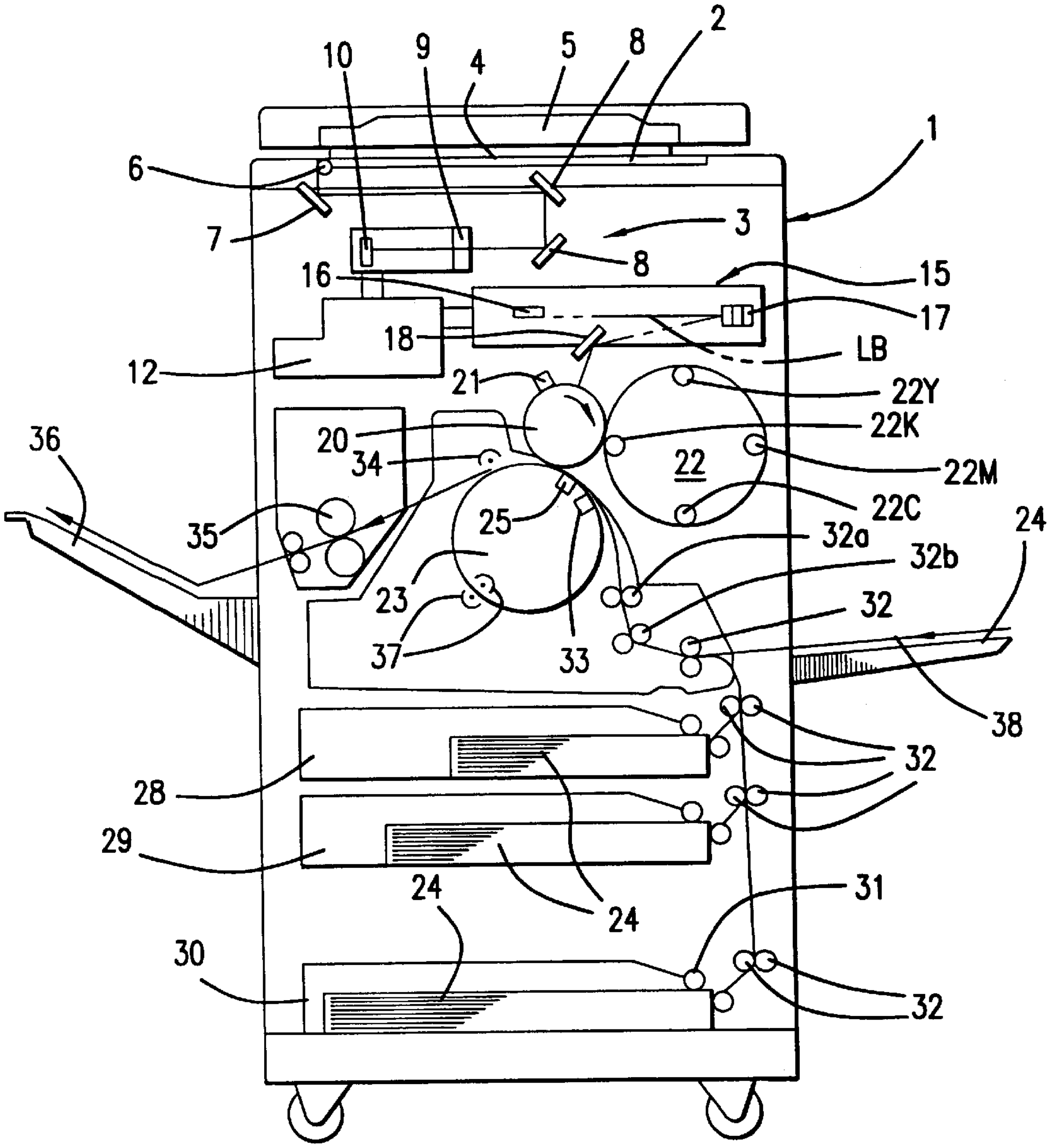
FIG. 11 is a drawing to show the configuration of a digital color image formation system to which a punching system according to the invention can be applied.

FIG. 11 shows a digital color image formation system of a multiple transfer system to which a punching system according to the invention can be applied.

In FIG. 11, numeral 1 is the main unit of a digital color image formation system. An image input terminal 3 for reading an image of an original document 2 is placed on the top end in the digital color image formation system main unit 1. The image input terminal 3 illuminates the image of the original document 2 placed on platen glass 4 in pressed relation by a platen cover 5 by a light source 6, scans and exposes a reflected light image of the original document 2 to a CCD sensor 10 via first and second scanning mirrors 7 and 8 and an image formation lens 9, and reads a color material reflected light image of the original document 2 by the CCD sensor 10 at a predetermined dot density (for example, 16 dots/mm).

The color material reflected light image of the original document 2 read by the image input terminal 3 is sent to an image processing system 12 as 3-color original reflection factor data of red (R), green (G), and blue (B) (each eight bits), for example. The image processing system 12 performs predetermined image processing of shading correction, position shift correction, lightness/color space conversion, gamma correction, frame erasion, color/move edit, etc., for the reflection factor data of the original document 2.

The image data undergoing the predetermined image processing by the image processing system 12 is converted into 4-color original color material gradation data of black (X), yellow (Y), magenta (M), and cyan (C) (each eight bits) and sent to an ROS 15 (raster output scanner), which then exposes an image to a laser beam LB in response to the original color material gradation data.

The ROS 15 modulates a semiconductor laser 16 in response to the original color material gradation data and emits a laser beam LB from the semiconductor laser 16 in response to the gradation data, as shown in FIG. 11. The laser beam LB emitted from the semiconductor laser 16 is deflected and scanned by means of a rotation polygon mirror 17 and is scanned over a photosensitive drum 20 via a reflection mirror 18.

The photosensitive drum 20 over which the laser beam LB is scanned by the ROS 15 is rotated at a predetermined speed along the arrow direction by drive means (not shown). The surface of the photosensitive drum 20 is previously charged to a predetermined potential by a charge scorotron 21, then the laser beam LB is scanned over the surface in response to the original color material gradation data, thereby forming an electrostatic latent image. The electrostatic latent Image formed on the photosensitive drum 20 is developed in order by a rotary developing unit 22 comprising four color developing devices of black 22K, yellow 22Y, magenta 22M, and cyan 22C to form predetermined color toner images.

The toner images formed on the photosensitive drum 20 are transferred in order onto recording paper 24 as a sheet material held on a transfer drum 23 placed adjoining the photosensitive drum 20 as a transfer corotron 25 is charged. As shown In FIG. 11, the recording paper 24 is fed by a paper feed roll 31 from a plurality of paper feed cassettes 28, 29, and 30 placed in the lower part in the image formation system 1 and can also be fed from a manual tray 38 placed on a side face outside the image formation system 1. The fed recording paper 24 is transported to the surface of the transfer drum 23 by a plurality of pairs of rollers 32. Each pair of the roller 32 include a, transport roller 32*a* and a registration roller 32*b*. It is held on the surface of the transfer drum 23 in a state in which the recording paper 24 is electrostatically attracted on the surface of the transfer drum 23 as an attraction corotron 33 is charged. In addition to nonstandard-size recording paper, transparent OHP sheets for an overhead projector or cardboards such as special postcards can also be fed from the manual tray 38 and an image can also be formed on an OHP sheet, etc. From the manual tray 38, recording paper 24 having an image formed on one side is turned upside down and is fed, whereby a double-sided copy can also be made.

The recording paper to which toner images of a predetermined number of colors are transferred from the surface of the photosensitive drum 20 is stripped off from the surface of the transfer drum 23 as a stripping corotron 34 is charged, then is transported to a fuser 35, which then fixes the toner images on the recording paper 24 by heat and pressure. The recording paper 24 is discharged onto a paper discharge tray 36 and the color image formation process is complete.

In FIG. 11, numeral 37 denotes an electricity removal corotron pair for removing electricity on both the surface and rear face of the transfer drum 23.

Embodiment 1

By the way, a punching system according to a first embodiment of the invention is used in combination with a digital color image formation system configured as described above, for example, to punch holes in a sheet material of recording paper, etc., on which a color image is formed. For example, the punching system is attached to the outside of a discharge section of a digital color image formation system as one of postprocessing units in place of the discharge tray 36, but may be integrally built In the digital color image formation system, of course.

To punch holes for each sheet by the punching system, the variations in the width direction positions of the sheets and skew thereof cause punch hole position accuracy to be worsened. Different setting of recording paper 24 on the paper feed cassettes 28, 29, and 30, eccentricity of the transport roll 32, slipping of a sheet of recording paper 24, etc., with respect to the transport roll 32, or the like is possible as the factor of causing the variations in the width direction positions of the sheets and skew thereof. However, the degree to which the variations in the width direction positions of the sheets and skew thereof occur vary depending on the structure, durability, etc., of an image formation system; in image formation systems in which the variations in the width direction positions of the sheets and skew thereof occur a little, the punch hole position accuracy scarcely becomes a problem if special steps are not taken.

Then, the punching system according to the first embodiment is applied to image formation systems with small variations in the width direction positions of the sheets and small skew thereof; the punch hole diameter is set a little large a required for countermeasures against the variations in the width direction positions of the sheets and skew thereof. However, image formation systems with large variations in the width direction positions of the sheets and large skew thereof need to use a punching system dealing with the variations In the width direction positions of the sheets and skew thereof as shown in other embodiments described later.

Figure 1:
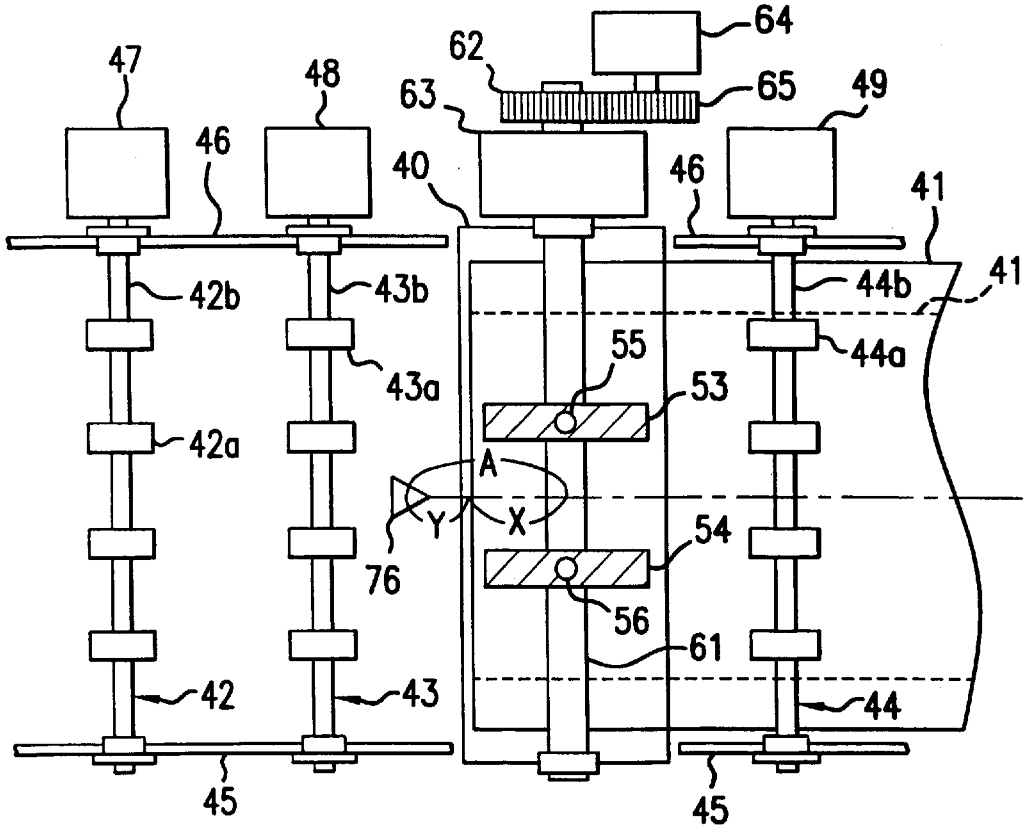
FIG. 1 is a plan view to show the configuration of a first embodiment of a punching system according to the invention.
Figure 2:
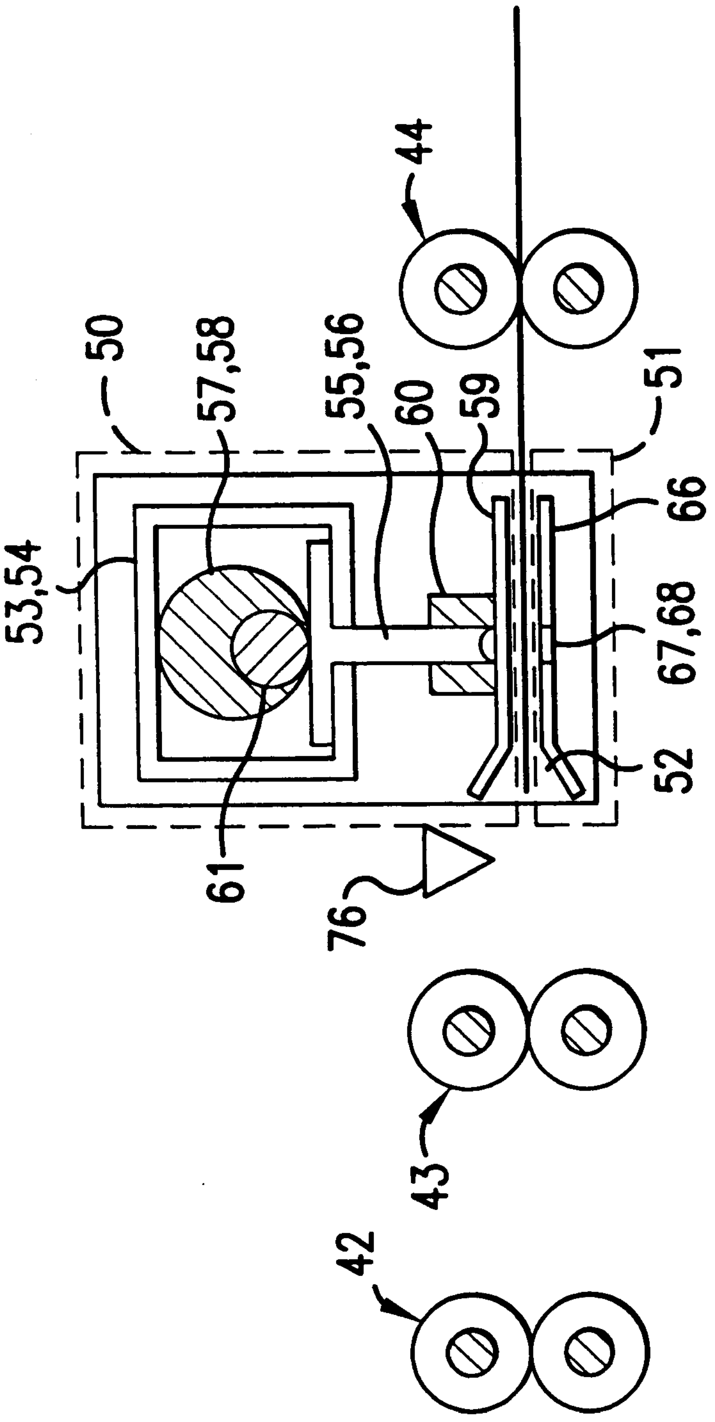
FIG. 2 is a sectional view to show the configuration of the first embodiment of the punching system according to the invention.

FIGS. 1 and 2 are a plan view and a sectional view, respectively, to show the punching system according to the first embodiment of the invention.

In FIGS. 1 and 2, numeral 40 denotes a punching system main unit, which is attached to the outside of the digital color image formation system main unit 1 as one of postprocessing units in place of the discharge tray 36, for example. A first roll pair 42 and a second roll pair 43 for transporting a sheet 41 of recording paper, etc., to the punching system main unit 40 are placed in parallel with each other forward of the sheet transport direction of the punching system main unit 40. A third roll pair 44 for transporting a sheet 41 punched as required by a punching mechanism of the punching system to a discharge tray, etc., (not shown) is placed at the rear of the sheet transport direction of the punching system main unit 40. The first, second, and third roll pairs 42, 43, and 44 are pivotally supported on fixing frames 45 and 46 of postprocessing units including the punching system for rotation and driving transport rolls 42*a*, 43*a*, and 44*a* are rotated by drive motors 47, 48, and 49 attached to the ends of rotation shafts 42*b*, 43*b*, and 44*b* of the driving transport rolls 42*a*, 43*a*, and 44*a* for transporting and stopping the sheet 41.

As shown in. FIG. 2, the punching mechanism of the punching system consists of a punch section 50 and a die section 51, and a slit-like transport passage 52 through which the sheet 41 transported by the first, second, and third roll pairs 42, 43, and 44 passes is formed between the punch section 50 and the die section 51. As shown in FIGS. 1 and 2, the punch section 50 is made up of two frames 53 and 54 being placed in a predetermined spacing equivalent to the punch hole spacing in a direction perpendicular to the transport direction of the sheet 41 and having side faces formed like rectangles, punches (also known as punching edges) 55 and 56 attached to the two frames 53 and 54, eccentric cams 57 and 58 placed rotatably in the frames 53 and 54, a punch section paper guide 59 for defining the slit-like transport passage 52 through which the sheet 41 passes, a guide member 60 for guiding the lower ends of the punches, 55 and 56 fixed onto the punch section paper guide 59, a cam shaft 61 to which the eccentric cams 57 and 58 are attached, a spring clutch 63 with a gear 62 attached to the end of the cam shaft 61, a solenoid (not shown) for turning on/off the spring clutch 63, and a drive gear 65 being fixed to a shaft of a punching motor 64 for transmitting a driving force to the gear 62 of the spring clutch 63.

Figure 3:
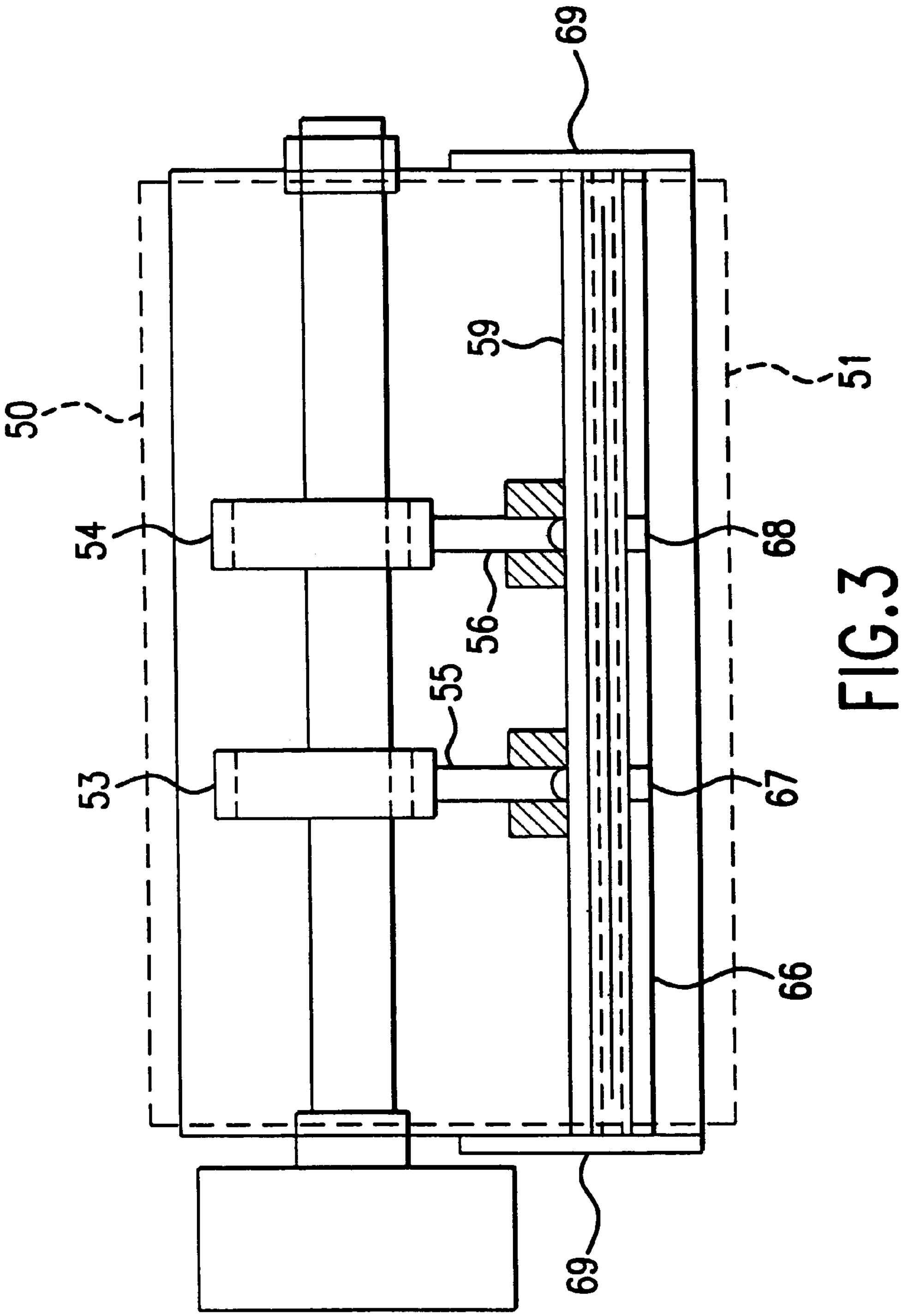
FIG. 3 is a front view to show the configuration of the punching system according to the first embodiment of the invention.
Figure 4:
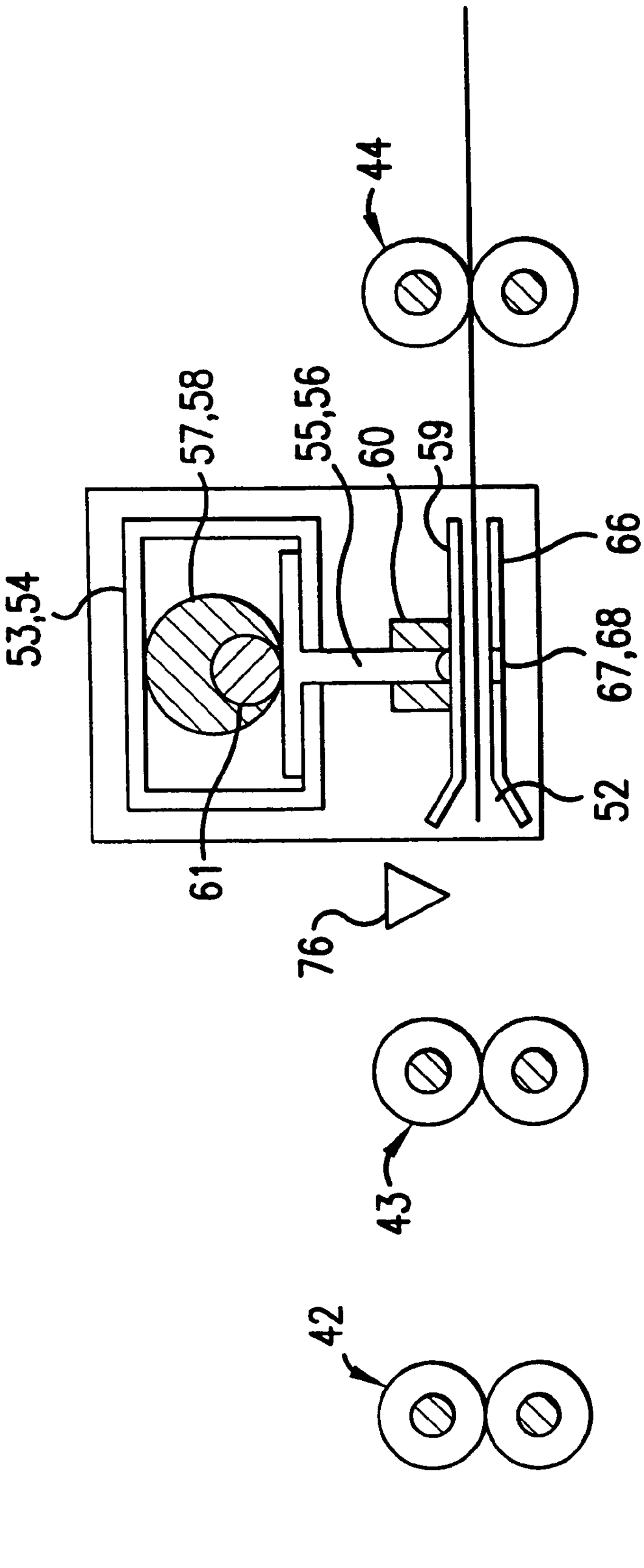
FIG. 4 is a sectional view to show the operation of the punching system shown in FIG. 1.

On the other hand, the die section 51 is made up of a die section paper guide 66 for defining the slit-like transport passage 52 through which the sheet 41 passes, and dies 67 and 68 being fixed to the die section paper guide 66 and placed at the positions corresponding to the punches, 55 and 56. The punch section 50 and the die section 51 are integrally coupled to each other by a coupling member 69 at a position where the size in the width direction running through the punching system is wider than the maximum sheet 41, as shown in FIG. 3.

Figure 5:
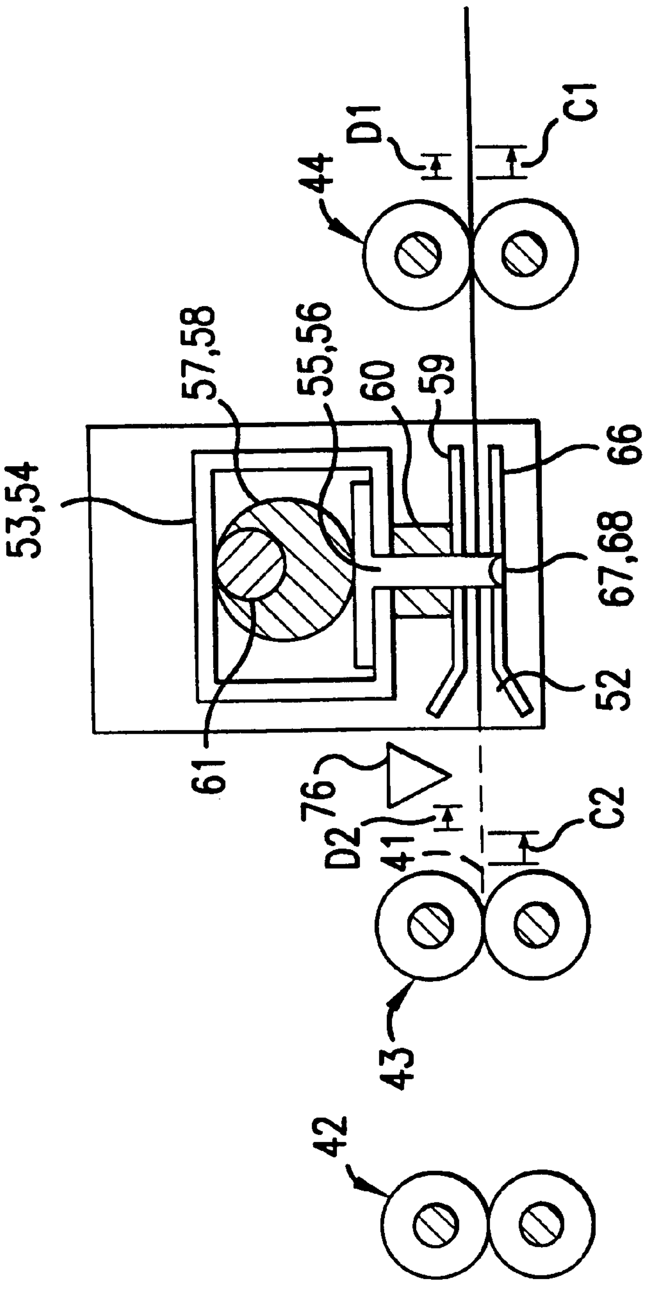
FIG. 5 is a sectional view to show the operation of the punching system shown in FIG. 1.

When the punching system thus configured does not punch holes, a stopper in the spring clutch 63 is applied and if the punching motor 64 is turned, the cam shaft 61 does not rotate. At this time, the punches, 55 and 56 are placed at upper positions where they do not project to the slit-like transport passage 52 from the punch section paper guide 59. When the punching system punches holes, the stopper in the spring clutch 63 is released by the solenoid (not shown) and the cam shaft 61 is rotated by driving the punching motor 64. As a result, the eccentric cams 57 and 58 rotate in conjunction with the cam shaft 61, pushing down on the punches, 55 and 56, which pierce the sheet 41 placed between the punch section paper guide 59 and the die section paper guide 66 and enter holes of the dies 67 and 68 of the die section 51, making punch holes 70 and 71 at predetermined positions of the sheet 41, as shown in FIG. 5. This state results from performing the operation of the first half of one revolution of the cam shaft 61; as the cam shaft 61 makes the latter half revolution, the stopper is applied by the solenoid with the punches 55' and 56' restored to the upper standby positions, stopping the rotation of the cam shaft 61.

That is, the punching system turns on/off the solenoid once, whereby the cam shaft 61 makes one revolution for punching the sheet 41. The punching system punches the sheet 41 with the sheet 41 once stopped between the punch section paper guide 59 and the die section paper guide 66.

Figure 6:
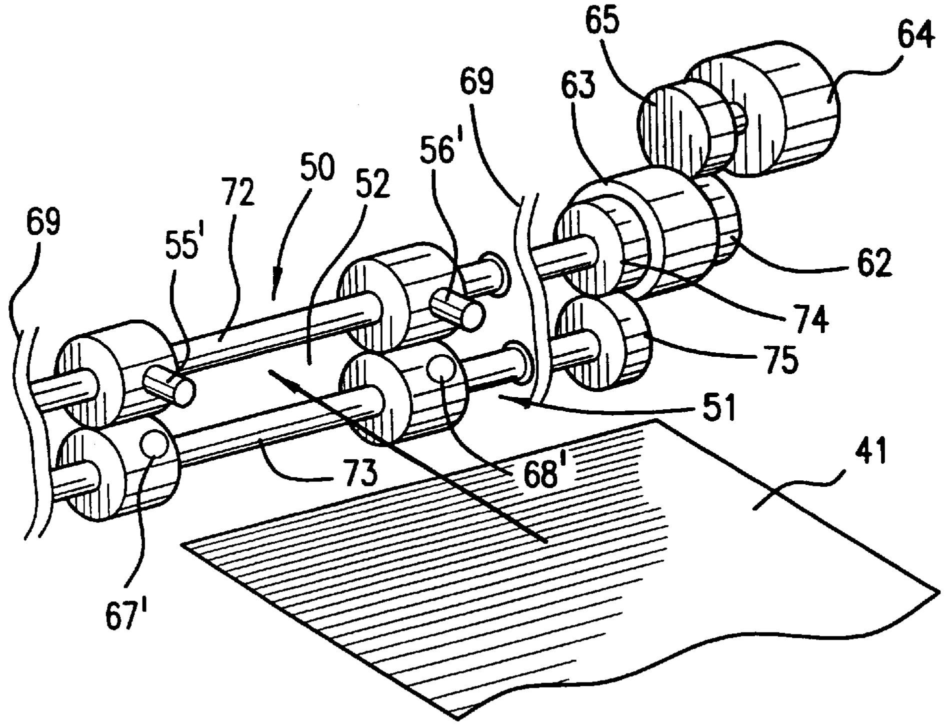
FIG. 6 is a perspective view to show a modified embodiment of the punching system according to the first embodiment of the invention.

A punching system shown in FIG. 6 punches a sheet 20 with the sheet transported without once stopping the sheet.

As shown in FIG. 6, the punching system consists of a punch section 50 and die section 51 and a sheet 41 runs on a transport passage 52 formed between the punch section 50 and the die section 51. The punch section 50 is made up of punching edges 55 and 56 fixed to a punch shaft 72, a spring clutch 63 with a gear 62 attached to the end of the punch shaft 72, a solenoid (not shown) for turning on/off the spring clutch 63,.a gear 65 being fixed to a shaft of a punching motor 64 for transmitting a driving force to the gear 62 of the spring clutch 63, and a gear 74 for transmitting a driving force to a die shaft 73. On the other hand, the die section 51 is made up of dies 67' and 68' being fixed to the die shaft 73 and placed at the positions corresponding to the punches 55' and 56' and a gear 75 being attached to the end of the die shaft 73 for receiving a driving force transmitted from the gear 74 of the punch shaft 72. The gear 75 has the same number of teeth as the gear 74 attached to the end of the punch shaft 72. The punch section 50 and the die section 51 are coupled to each other by a coupling member 69 at a position where the size in the width direction running through the punching system is wider than the maximum sheet 41.

When the punching system thus configured does not punch holes, a stopper in the spring clutch 63 is applied and if the punching motor 64 is turned the punch shaft 72 and the die shaft 73 do not rotate. At this time, the punches 55' and 56' are placed at upper positions where they do not disturb transporting a sheet 41. When the punching system punches holes, the stopper is released by the solenoid (not shown) and the punch shaft 72 and the die shaft 73 are rotated in a state in which they are synchronized with each other. Holes are punched in predetermined positions of the sheet 41 with the punches 55' and 56' rotating in synchronization with transporting of the sheet 41 and the dies 67' and 68', and the stopper is applied where the punches 55' and 56' of the punch shaft 72 are restored to the upper positions, then the operation stops.

That is, the punching system turns on/off the solenoid once, whereby the punch shaft 72 and the die shaft 73 make one revolution for punching the sheet 41. Thus, the punching system punches the sheet 41 without stopping the sheet 41.

The punching system is applied to image formation systems with small variations in the width direction positions of the sheets 41 and small skew thereof; the diameter of a punch hole 70, 71 is set a little large as required for countermeasures against slight variations in the width direction positions of the sheets 41 and slight skew thereof.

When the digital color image formation system to which the punching system is applied adopts a so-called "center registration" system for forming an image with the axial center of the photosensitive drum 20 as the reference and transporting a sheet 41 such as recording paper with the width direction center as the reference, if the variations in the width direction positions of the sheets 41 and skew thereof are small, the punching system main unit 40 is fixedly placed at a position where the width direction center line of each sheet 41 is matched with the middle line of the punches 55 and 56, as shown in FIG. 1. In the image formation system, the width direction center positions of the sheets 41 are the same regardless of the size of sheet 41.

Therefore, in the punching system, the sheet 41 is always transported with the width direction center line as the reference regardless of the size of sheet 41 and the punching positions of holes 70 and 71 of the sheet 41 are also determined with the width direction center of the sheet 41 as the reference and always become constant. Thus, the punching system need not sense the end margin in the width direction of the sheet 41 and may sense the and margin In the transport direction of the sheet 41 (front or rear end) and determine only the distance (in mm units) of the hole 70, 71 punched from the end margin in the transport direction of the sheet 41 as a constant or for each sheet 41. Thus, as shown in FIGS. 1 and 2, the punching system comprises a paper transport direction end margin sensing sensor 76 placed between the second transport pair 43 and the punching system main unit 40 and between the punches 55 and 56 (at the middle position of the punches 55 and 56 in the example shown in the figure) for sensing the end margin in the transport direction of the sheet 41. For example, a sensor for optically sensing the end margin of the sheet 41 is used as the paper transport direction end margin sensing sensor 76, but the sensor is not limited to it and may sense the end margin of the sheet 41 in a different manner, needless to say. At this time, assume that the distance between the middle of the punching edges 55 and 56 and the sensing position of the paper transport direction end margin sensing sensor 76 is A mm. In the first embodiment, for example, the paper transport direction end margin sensing sensor 76 senses the rear end of a sheet 41 and the rear end of the sheet 41 is punched; the paper transport direction end margin sensing sensor 76 may sense the front end of a sheet 41 and the front end of the sheet 41 may be punched, of course.

In the configuration, when punching holes 70 and 71 in the rear end of a sheet 41 of recording paper, etc., the punching system according to the first embodiment controls the positions of the punch holes 70 and 71 as follows:

First, in the digital color image formation system, as shown in FIG. 1, a sheet 41 of recording paper, etc., on which a color image is formed is passed to the first and second transport roll pairs 42 and 43 and is transported by the first and second transport roll pairs 42 and 43 to the punching system main unit 40 at a predetermined transport speed (Bending the sheet a certain number of millimeters (mm) for one second). Now, assume that the distance from the rear end of the sheet 41 to the middle of the holes 70 and 71 is X mm as shown in FIG. 1. When the paper transport direction end margin sensing sensor 76 senses the rear end of the sheet 41 and then the sheet 41 is transported by Y=(A−X) mm, the drive motor 49 of the third transport roll pair 44 is stopped, whereby the sheet 41 may be stopped and punched.

That is, the punching system transports the sheet 41 at the transport speed of 8 mm a second by the first, second, and third transport roll pairs 42, 43, and 44, stops the motor 49 driving the third transport roll pair 44 in (Y/B) seconds after the paper transport direction end margin sensing sensor 76 senses the rear end of the sheet 41 for stopping the sheet 41, and operates the solenoid as described above for punching.

Figure 7:
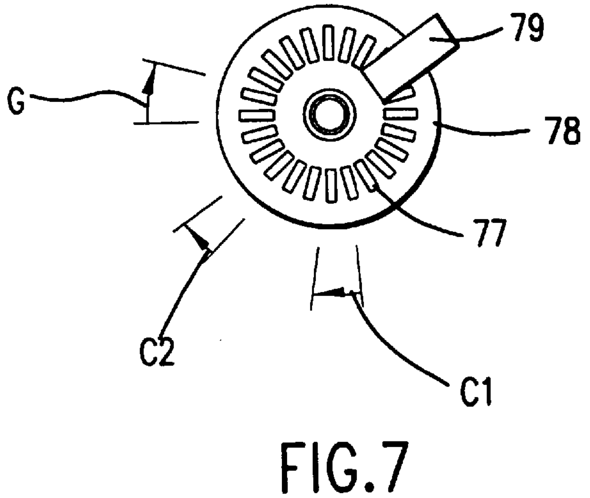
FIG. 7 is a view to show the configuration of an encoder.

In this case, the first, second, and third transport roll pairs 42, 43, and 44 and the punching operation of the punching system are controlled based on the time, but the invention is not limited to it. As shown in FIG. 7, an encoder 78 being fixed to the rotation shaft **44*b* of the third transport roll pair 44 and having slits 77 made at equal angles, a sensor 79 for sensing the slits 77 of the encoder 78, and a counter (not shown) for counting the number of slits 77 sensed by the sensor 79 are disposed. Assume that the sheet feed amount of the third transport roll pair 44 corresponding to the angle between the adjacent slits 77 is C1 mm. After the paper transport direction end margin sensing sensor 76 senses the rear end of the sheet 41, the counter counts the number of slits 77 passing through the sensor 79 and when the count value of the counter reaches (Y/C1), the roll drive motor 49 may be stopped for punching the sheet 41**.

If the roll drive motor 49 for transporting the sheet 41 is made of a stepping motor for transporting the sheet 41 by D1 mm on one pulse, after Y/D1 pulses are output since the rear end of the sheet was sensed, the roll drive motor 49 may be stopped (pulse output may be stopped) for punching the sheet 41.

After the punching system punches the sheet as described above, the roll drive motor 49 is operated and again the sheet 41 formed with punch holes 70 and 71 are discharged to the discharge tray, etc., (not shown) by the third transport roll pair 44. The punching operation is now complete.

If the paper transport direction end margin sensing sensor 76 senses the front end of the sheet 41 and the front end of the sheet is punched, assuming that the distance between the front end of the sheet and the middle of the holes 70 and 71 is X mm, when the sheet 41 Is moved by Y=(A+X) mm after the front end of the sheet 41 is sensed, the sheet 41 may be stopped and punched. Thus, the roll drive motors 47 and 48 may be stopped for punching the sheet in (Y/B) seconds after the paper transport direction end margin sensing sensor 76 senses the front end of the sheet. If an encoder 78 being fixed to the rotation shaft **44*b* of the third transport roll pair 44 and having slits 77 made at equal angles as shown in FIG. 7, a sensor 79 for sensing the slits 77 of the encoder 78, and a counter for counting the number of slits 77 sensed by the sensor 79 are provided and the sheet transport amount of the second transport roll pair 43 corresponding to the angle between the adjacent slits 77 is C2 mm, when the counter counts the number of slits 77 after the front end of the sheet is sensed, and reaches (Y/C2), the roll drive motor 48 may be stopped for punching the sheet 41. At this time, if the roll drive motor 48 is made of a stepping motor for transporting the sheet 41 by D2 mm on one pulse, after Y/D2 pulses are output since the front end of the sheet was sensed, the roll drive motor 48 is stopped (pulse output is stopped) and the sheet 41 is stopped and punched. At this time, the roll drive motor 47 is also stopped in synchronization with stopping the roll drive motor 48. After the sheet is punched, again the roll drive motors 47 and 48 are operated for sending the sheet 41**.

Assuming that the time interval between the instant at which the solenoid is turned on and the instant at which holes are punched in the sheet 41 is E seconds in the punching system shown in FIG. 6, the distance of feeding the sheet 41 meanwhile becomes (BXE) mm. Thus, when the sheet 41 is moved by Y=(A−X−BXE) mm after the rear end of the sheet is sensed or by Y=(A+X−BXE) mm after the front end of the sheet is sensed, the solenoid may be turned on for punching the sheet.

In the first embodiment, the positions at which the holes 70 and 71 are punched in the front or rear end of the sheet 41 are fixed, but can also be changed as desired. To do this, an arbitrary distance of X mm between the front or rear end of the sheet 41 and the middle of the punch holes 70 and 71 is entered on an operation panel of the image formation system. The value of X mm entered through the operation panel is converted into any of the time, the count, or the number of pulses by calculation means based on the above-described calculation method, and the first, second, and third transport roll pairs 42, 43, and 44 for transporting the sheet 41 may be stopped based on the parameter for punching the sheet.

Since the paper transport direction end margin sensing sensor 76 is placed on the sheet transport passage corresponding to the middle part of the two punches 55 and 56 in the first embodiment if there are slight variations in width direction positions of sheets 41 and slight skew thereof, the position shift of the hole 70, 71 can be suppressed to the degree to which it scarcely becomes a problem.

Figure 8:
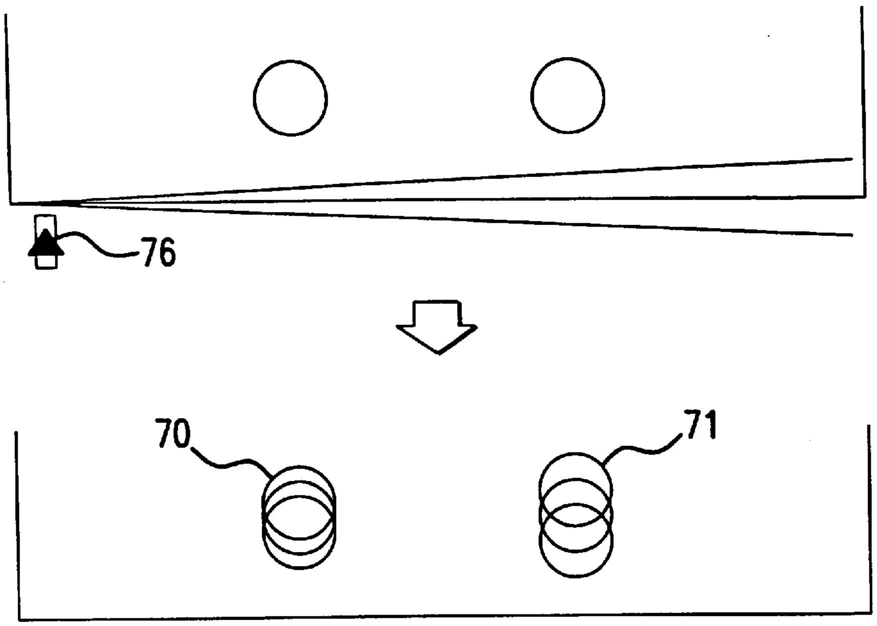
FIG. 8 is an illustration to show how a sheet is punched.
Figure 9:
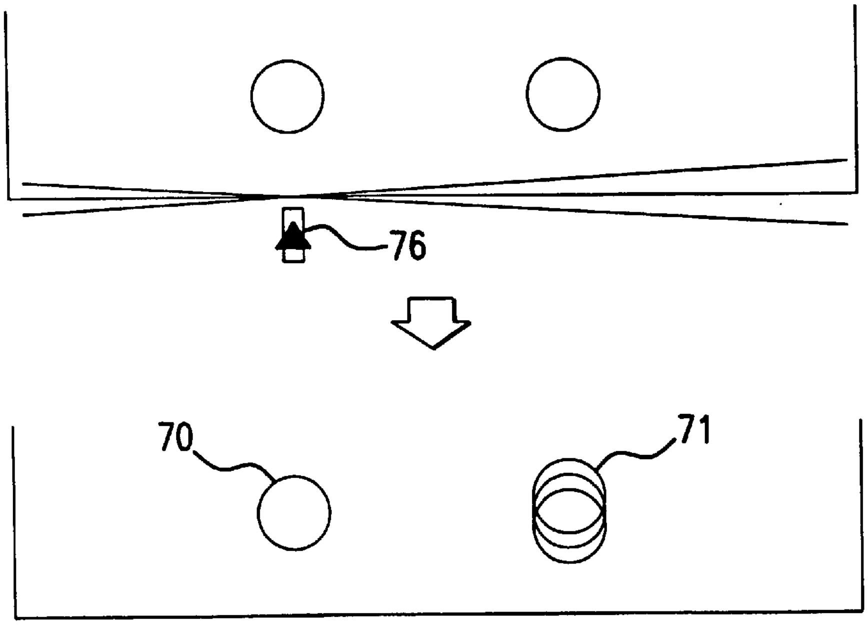
FIG. 9 is an illustration to show how a sheet is punched.
Figure 10:
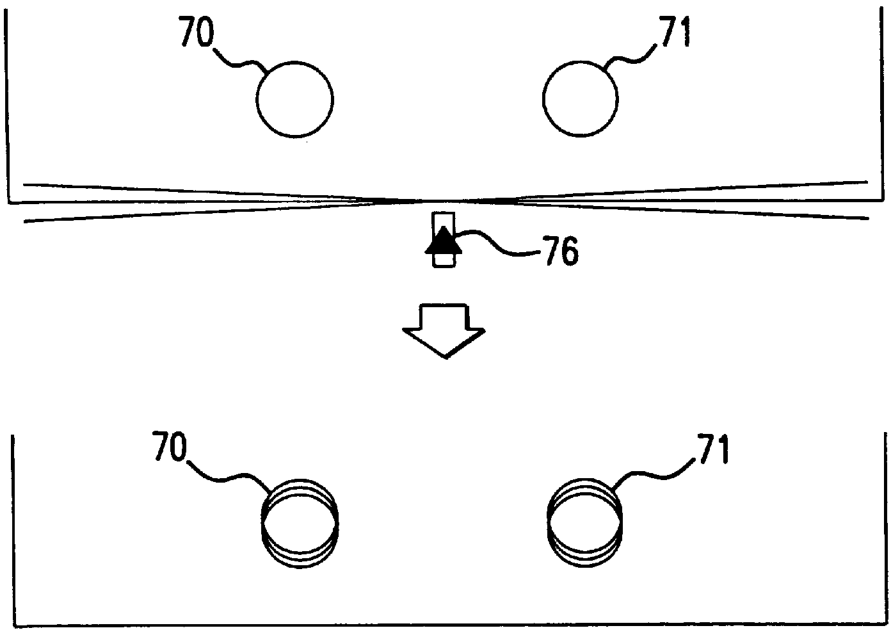
FIG. 10 is an illustration to show how a sheet is punched.

That is, FIGS. 8 to 10 show how the positions of the holes 70 and 71 in the sheet 41 vary in response to skew if the sheet 41 is slightly skewed when the placement of the paper transport direction end margin sensing sensor 76 is changed along the width direction of the sheet 41.

FIG. 8 shows an example where the paper transport direction end margin sensing sensor 76 is placed at one end in the width direction of the sheet 41. As seen in the figure, if the paper transport direction and margin sensing sensor 76 senses the end margin of the sheet 41 and the sheet 41 is punched, skew of the sheet 41 causes the position accuracy of the punch holes 70 and 71 to be worsened largely. FIG. 9 shows an example where the paper transport direction end margin sensing sensor 76 is placed corresponding to one hole 70. As seen in the Figure, the position accuracy of the hole 70 corresponding to the sensing sensor 76 is good, but that of the other hole 71 worsens. FIG. 10 shows an example where the paper transport direction end margin sensing sensor 76 is placed at the middle of both the holes 70 and 71; the best total position accuracy of the holes 70 and 71 is provided.

Embodiment 2

Figure 12:
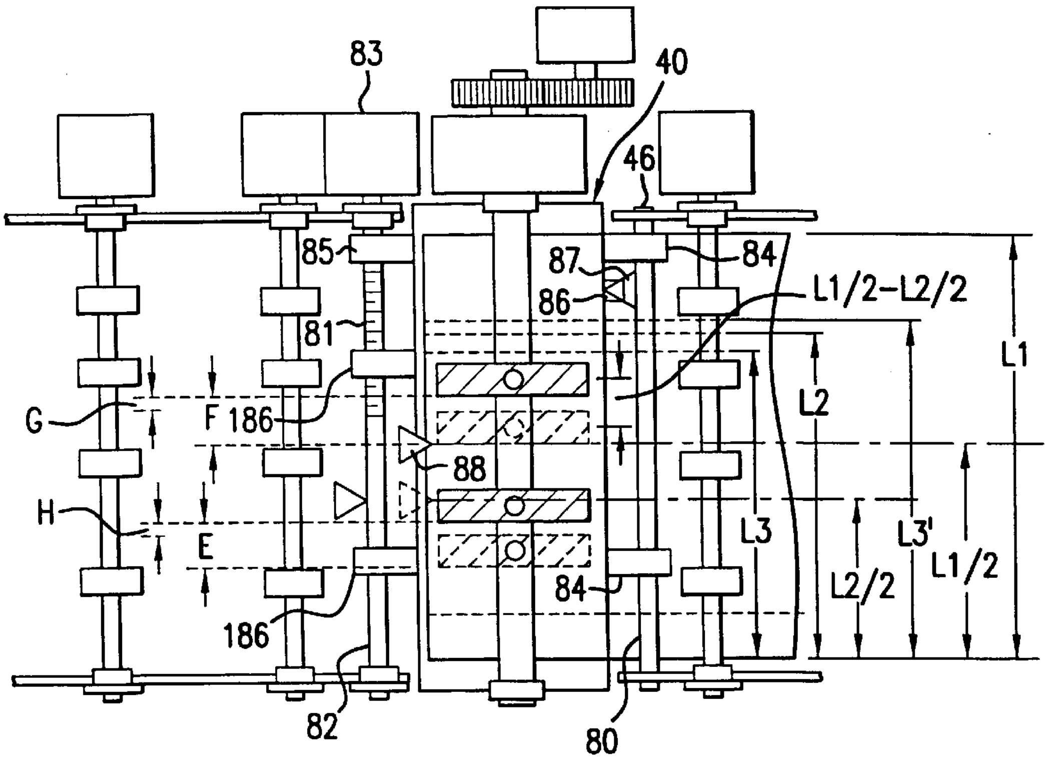
FIG. 12 is a plan view to show the configuration of a second embodiment of a punching system according to the invention.
Figure 13:
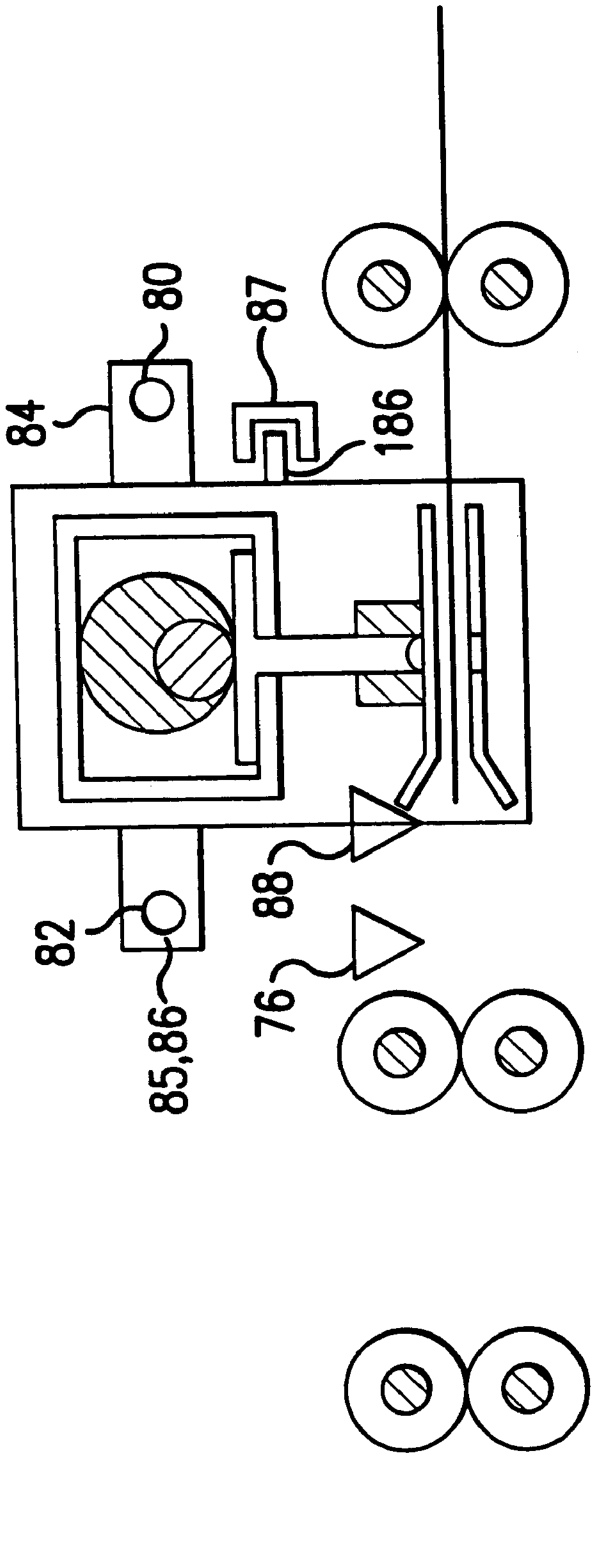
FIG. 13 is a sectional view to show the configuration of the second embodiment of the punching system according to the invention.

FIGS. 12 and 13 show a punching system according to a second embodiment of the invention. Parts identical with or similar to those of the first embodiment previously described are denoted by the same reference numerals. The punching system according to the second embodiment is applied to an image formation system of a so-called "side registration" system for forming an image with one axial end of a photosensitive drum 20 as the reference and transporting a sheet 41 of recording paper, etc., with one end of the width direction thereof as the reference for forming an image on the sheet, and moreover is applied to a system with small variations in the width direction positions of the sheets 41 and small skew thereof. With the punching system, the center line position in the width direction of each sheet 41 varies depending on the size of sheet 41, thus the middle of punching edges 55 and 56 needs to be aligned with the center line of a sheet 41 of each size before the sheet is punched.

Then, the punching system according to the second embodiment comprises move means for moving a punching system main unit 40 containing a punch section 50 and a die section 51 as a punching mechanism along the width direction of a sheet 41 in response to the sheet 41 size, etc., based on size information in the width direction of sheet 41 and information as to whether or not the sheet is to be punched.

That is, as shown in FIG. 12, the punching system comprises move means for moving the punching system main unit 40 along the width direction of a sheet 41, the move means being made up of a guide shaft 80 for movably supporting the punching system main unit 40 along the width direction of the sheet 41, a rotatable guide shaft 82 having a part provided with a male screw part 81 for movably supporting the punching system main unit 40 along the width direction of the sheet 41, a punch move motor 83 for rotating the guide shaft 82, a bearing 84 sliding on the outer periphery of the guide shaft 80 and being fixed to the punching system main unit 40, a nut 85 being threadably engaged with the male screw part 81 of the guide shaft 82 and fixed to the punching system main unit 40, and a bearing 186 sliding on a portion of the guide shaft 82 other than the male screw part 81 and fixed to the punching system main unit 40. When the punch move motor 83 is turned forward, the punching system main unit 40 moves in the right direction relative to the paper width direction; when the punch move motor 83 is turned reversely, the punching system main unit 40 moves in the left direction.

Figure 14:
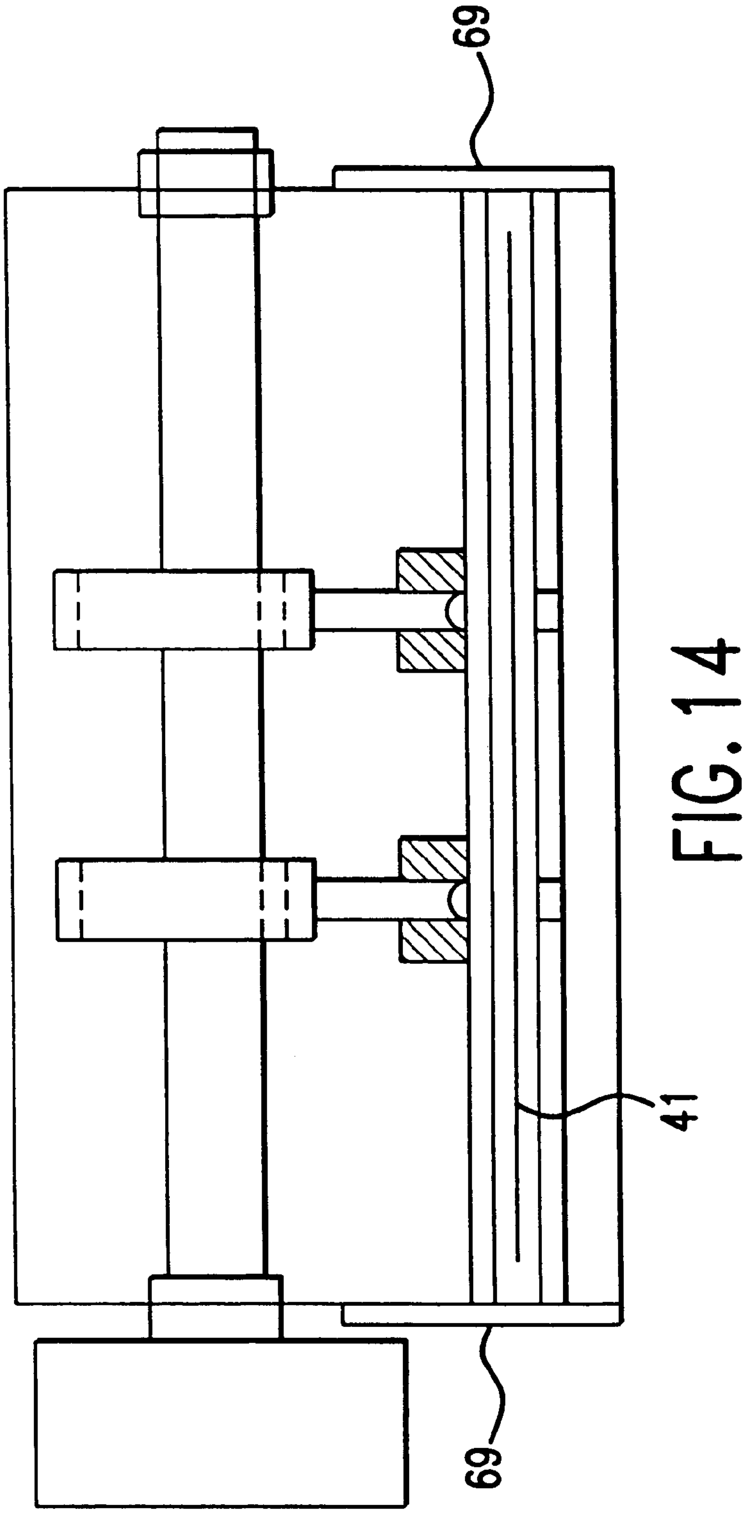
FIG. 14 is a front view to show a standby position of a punching system main unit.

When the punching system main unit 40 does not operate, it stands by at apposition where a sheet 41 of the maximum size in the width direction running through the punching system (the maximum size may differ from the maximum size of a sheet that can be punched) can run, that is, stands by at a home position (first standby position) where the middle line of punches 55 and 56 matches the center of a sheet 41 of the maximum size that can be punched (let the width size be L1). The home position of the punching system main unit 40 is sensed by an actuator 86 fixed to the punching system main unit 40 and a home position sensing sensor 87 fixed to a fixing frame 46. When the punching system main unit 40 lies at a position where it can punch a sheet 41 of the maximum width size (position shown in FIG. 12), the home position sensing sensor 87 senses the actuator 86 disposed in the punching system main unit 40. A coupling member 69 for coupling a punch section 50 and a die section 51 at the home position of the punching system main unit 40 is placed at a position wider than the maximum size in the width direction of a sheet 41 running through the punching system (the maximum size may differ from the maximum size of a sheet that can be punched) so that it does not disturb running of the sheet 41 of the maximum size in the width direction thereof, as shown in FIG. 14.

Further, a second paper transport direction end margin sensing sensor 88 for sensing the end margin in the transport direction of a sheet 41 is attached to the punching system main unit 40 at a position corresponding to the middle of the two punches 55 and 56 at the end of the side of a second transport roll pair 43. It can move along the width direction of the sheet 41 in conjunction with the punching system main unit 40.

In the configuration, the punching system according to the second embodiment punches the end margin of a sheet. First, when the punching system does not operate, the punching system main unit 40 stands by at the home position (first standby position) where a sheet 41 of the maximum size in the width direction running through the punching system can run, as shown in FIGS. 12 and 14.

If the width size of a sheet 41 of recording paper, etc., on which an image is formed is changed to L2 smaller than the maximum size (L1) according to paper size change information and a punching indication signal comes in the digital color image formation system according to punching execution information, before receiving the first sheet 41, the punching system main unit 40 moves by (L1/2−L2/2) mm from the home position to a second standby position and aligns the center of the sheet 41 with the middle of the two punches 55 and 56 of the punching system main unit 40. That is, if the size in the width direction of the sheet 41 to be punched by the punching system main unit 40 is L2, the punching system main unit 40 is moved to the end side used as the sheet transport reference in the width direction of the sheet 41 by (L1/2–L2/2) mm from the middle of the two punching edges 55 and 56.

The operation after moving the punching system main unit 40 As described above is similar to that in the first embodiment; the sheet 41 is transported by a predetermined amount Y mm along the transport direction and is stopped, then the rear or front end of the sheet 41 is punched by the punch section 50 and the die section 51 of the punching system main unit 40.

Figure 15:
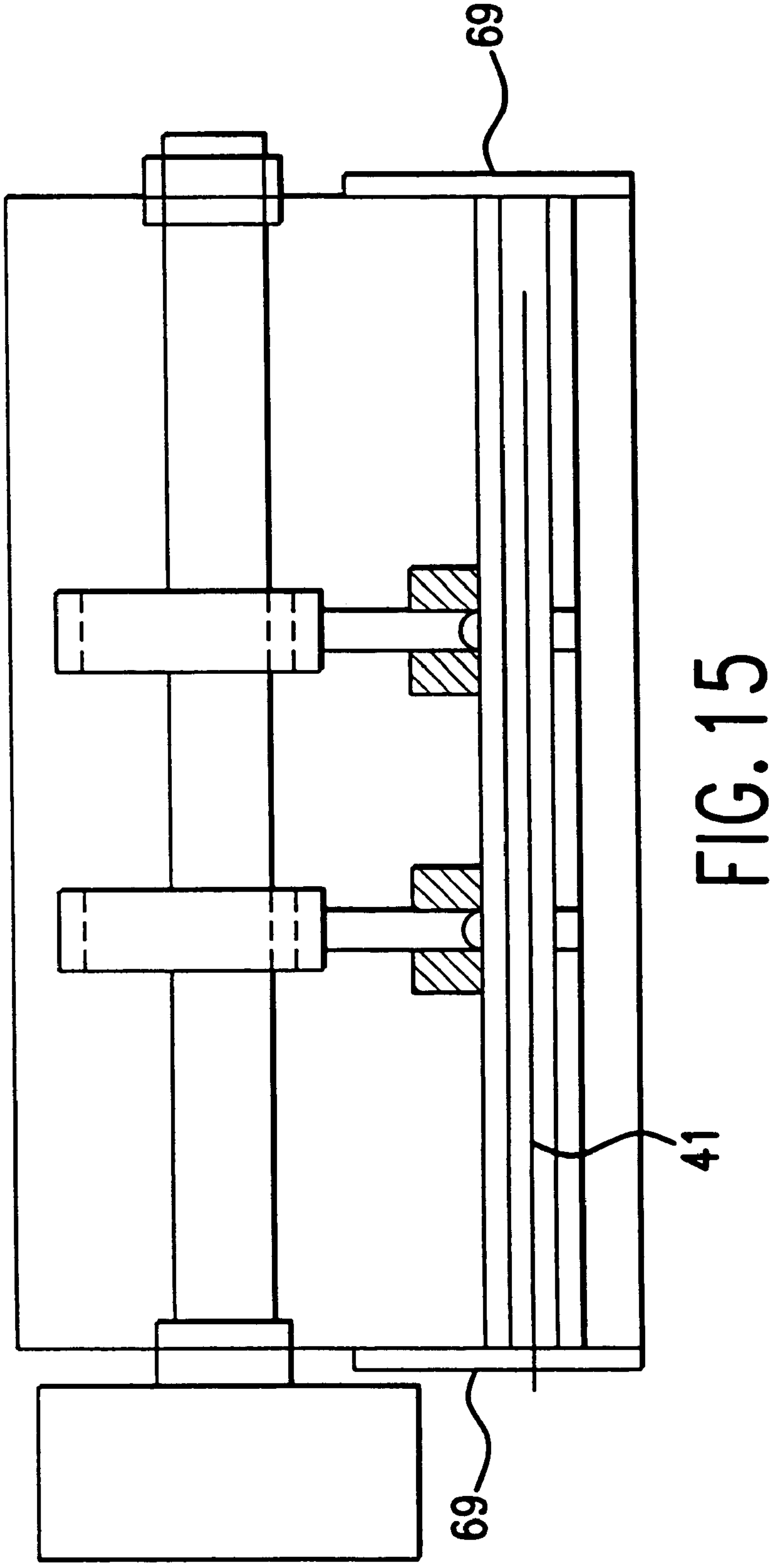
FIG. 15 is a front view to show another standby position of the punching system main unit.
Figure 16:
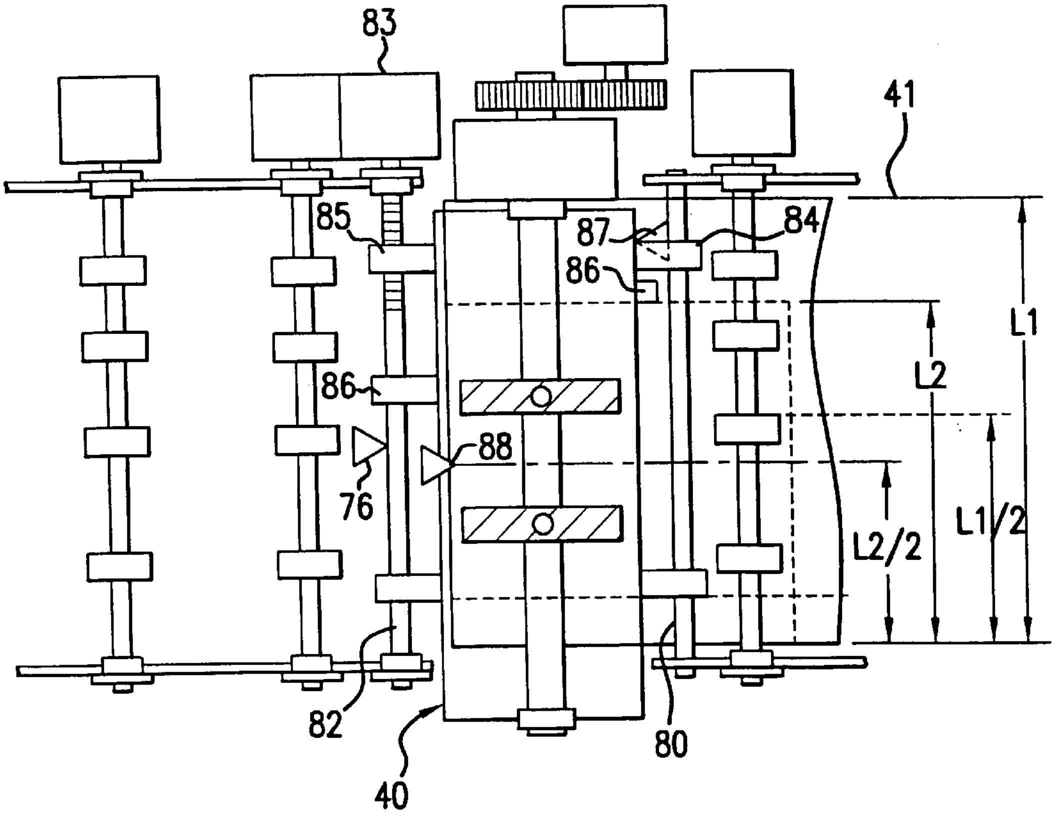
FIG. 16 is a front view to show another standby position of the punching system main unit.

If subsequent sheets 41 transported in sequence for punching are of the same size in the width direction as L2, the punching system main unit 40 may continue punching the sheets. However, at the second standby position, one coupling member 69 moves to a position disturbing running of the sheet 41 of the maximum size in the width direction running through the punching system main unit 40, as shown in FIG. 15. Thus, when a no-punching indication signal comes according to punching execution information, regardless of paper size change information, the punching system main unit 40 returns to the home position before the next sheet 41 is transported to the punching system main unit 40, as shown in FIGS. 12 and 14.

On the other hand, if L3 smaller than L2 as width direction size information of sheet 41 and a punching indication signal as punching execution information come at the second standby position, before receiving the sheet 41, the punching system main unit 40 is furthermore moved by (L2/2–L3/2) mm to a third standby position and the middle of the two punches 55 and 56 is aligned with the center in the width direction of the sheet 41. The subsequent operation is the same as in the first embodiment, and the sheet is punched. At the time, to punch holes 70 and 71 in positions at a predetermined distance of X mm from the end margin of the sheet 41, a sensing sensor needs to sense the end margin of the sheet 41. The sheet end margin is sensed with either a paper transport direction end margin sensing sensor 76 fixedly placed on a sheet transport passage or a paper transport direction end margin sensing sensor 88 attached to the punching system main unit 40. However, as described above, if the paper transport direction end margin sensing sensor 88 placed in the middle of the two punches 55 and 56 is used to sense the rear end of sheet 41, etc., holes 70 and 71 can be punched even In a skewed sheet 41 with comparatively good accuracy. In this case, since the paper transport direction end margin sensing sensor 88 is attached to the punching system main unit 40, if the rear end of sheet 41 is punched, there may be almost no difference between the stop position of the sheet 41 and the attachment position of the paper transport direction end margin sensing sensor 68. Thus, to always punch holes at a given distance of X mm from the rear end of the sheet 41, the paper transport direction end margin sensing sensor 88 may be placed at the distance X mm from the middle of the two punches 55 and 56 and when the paper transport direction end margin sensing sensor 88 senses the rear end of sheet 41, immediately the sheet 41 may be stopped and punched.

By the way, in calculation of a move distance when the punching system main unit 40 is moved, if the move distance is plus (the next sheet 41 is small), the punch move motor 83 is turned forward; if the move distance is minus (the next sheet is large), the punch move motor 83 is turned reversely. In the image formation system the sheet 41 is transported with one side end in the right direction relative to the travel direction of the sheet 41 as the reference.

In the second embodiment, if the punching system main unit 40 moves by F mm as the punch move motor 83 is operated for one second, for example, the punch move motor 83 is operated for ((L1/2–L2/2)/F) seconds to move the punching system main unit 40 from the home position (first standby position) to the second standby position.

Further, if an encoder 78 being fixed to the guide shaft 82 for moving the punching system main unit 40 and having slits 77 made at equal angles as shown in FIG. 7, a sensor 79 for sensing the slits 77, and a counter for counting the number of slits 77 sensed by the sensor 79 are provided and the move distance of the punching system main unit 40 corresponding to the angle between the adjacent slits 77 is G mm, when the counter counts the number of slits 77 after the punch move motor 83 starts to operate, and reaches ((L1/2–L2/2)/G), the punch move motor 83 is stopped, whereby the punching system main unit 40 can be moved to the second standby position. If the punch move motor 83 is made of a stepping motor for moving the punching system main unit 40 H mm on one pulse, the punch move motor 83 may be stopped (pulse output may be stopped), for example, after ((L1/2–L2/2)/H) pulses are output since the punch move motor 83 started to operate. To move the punching system main unit 40 from the standby position to the home position, the punch move motor 83 is turned reversely and when the home position sensing sensor 87 senses the actuator 86 disposed In the punching system main unit 40, immediately the punch move motor 83 is stopped.

The paper transport direction end margin sensing sensor 76 fixedly placed on the sheet transport passage is placed between the center line of the maximum size of a sheet that can be punched and the center line of the minimum size of a sheet that can be punched in order to lessen the effect of skew on sheets 41 of all width sizes that can be punched, as much as possible. When the paper transport direction end margin sensing sensor is placed at a position of the middle of the two punches 55 and 56, the best accuracy is provided, as described above. Then, in the second embodiment, the paper transport direction end margin sensing sensor 88 is attached integrally at a position on the sheet transport passage at the middle of the two punching edges 55 and 56 of the punching system main unit 40 and is associated with a move of the punching system main unit 40. The middle of the punches 55 and 56 is always matched with the center line of a sheet 41 of each width size at each standby position and the effect of skew can be lessened as much as possible for punching the sheet.

When the punching system main unit 40 returns from one standby position to the home position (first standby position) in the punching system, if the home position sensing sensor 87 does not sense the actuator 86 within a given time after the punch move motor 83 starts to operate due to a failure of the punch move motor 83, etc., it is determined that the punch move means fails. Likewise, if the home position sensing sensor 87 remains sensing the actuator 86 even after the expiration of a given time since the operation start of the punch move motor 83 to move the punching system main unit 40 from the home position (first standby position) to one standby position, still it is determined that the punch move means fails. When the failure occurs, if the home position sensing sensor 87 senses the actuator 86, the punching system main unit 40 is at the home position, as shown in FIG. 12. Then, a sheet 41 of the maximum size in the width direction running through the punching system main unit 40 can run, as shown in FIG. 14. Thus, in this case, the image formation system inhibits only punching and forms an image on the sheet 41, then discharges the sheet without punching the sheet.

On the other hand, if the home position sensing sensor 87 does not sense the actuator B6, there is a possibility that the coupling member 69 of the punching system main unit 40 may project to a position disturbing running of the sheet 41 of the maximum size in the width direction running through the punching system main unit 40, as shown in FIG. 15. If the sheet 41 passes through the punching system main unit 40 as it is, a paper jam occurs. Thus, in this case, punching is inhibited and a mode in which the sheet 41 runs through the punching system main unit 40 is also inhibited and a message indicating the fact is displayed on an operation panel of the image formation system.

In the punching system according to the second embodiment, when a move is made from one standby position to another standby position, if a move is made from a position where the home position sensing sensor 87 does not sense the actuator 86 to a position where the home position sensing sensor 87 does not sense the actuator 86, a failure of the move means of the punching system cannot be sensed. In this case, whenever the punching system main unit 40 is moved to a different standby position, it may be once restored to the home position (first standby position) and be moved from the home position to a different standby position, thereby sensing a failure according to whether or not the home position sensing sensor 87 senses.

Thus, in the second embodiment, although the image formation system to which the punching system is applied adopts the so-called side registration system, if variations in width direction positions of sheets 41 and skew thereof are small, the punching system main unit 40 can be moved in response to the width direction size of the sheet 41 for always punching the center in the width direction of the sheet 41.

In the second embodiment, the punching system main unit 40 is previously moved to a predetermined standby position based on the size information and punching execution information of sheet 41. Thus, if the sheet 41 size is changed, a move of the punching system main unit 40 can be completed in a short time and the punching system can also be applied to high-speed image formation systems. Moreover, if the punching system does not punch a sheet, the punching system main unit 40 is immediately moved to the same home position as the first standby position for a sheet 41 of the maximum size in the width direction and is made to stand by at the position. Thus, if a sheet 41 of a large size in the width direction as transported after a sheet 41 of a small size in the width direction is punched, the sheet 41 can be reliably prevented from being caught in the coupling member 69 of the punching system main unit 40 and a paper jam can be reliably prevented from occurring.

Embodiment Three

Figure 17:
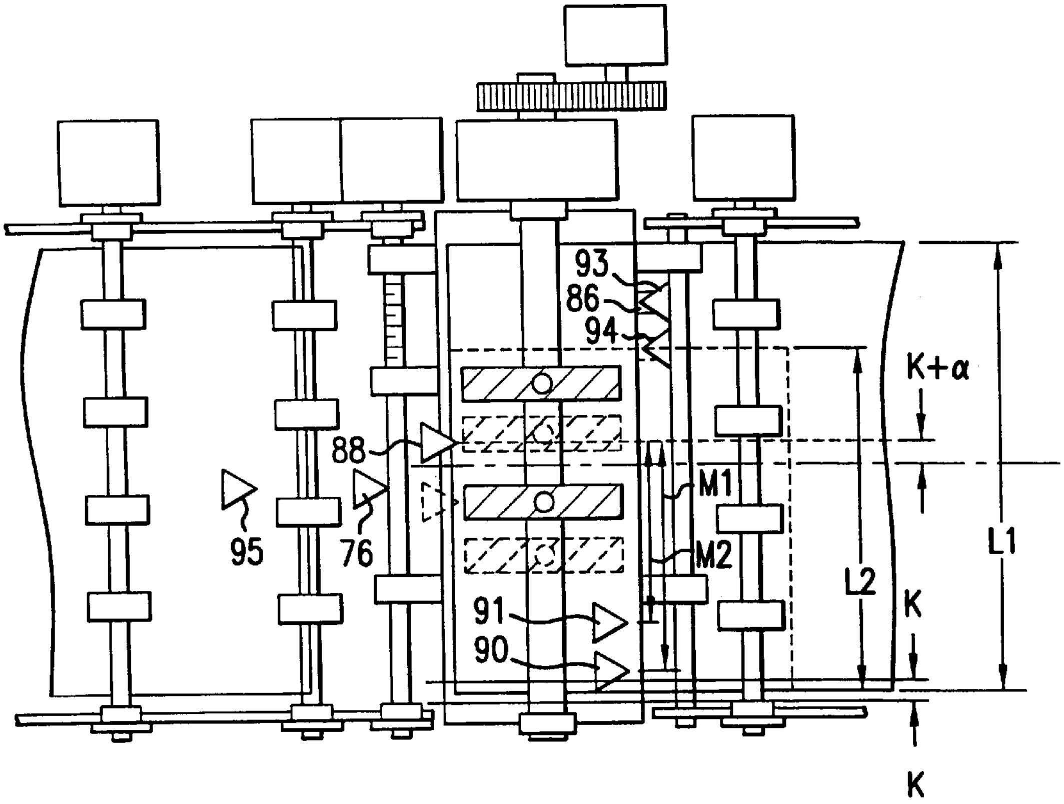
FIG. 17 is a plan view to show the configuration a third embodiment of a punching system according to the invention.
Figure 18:
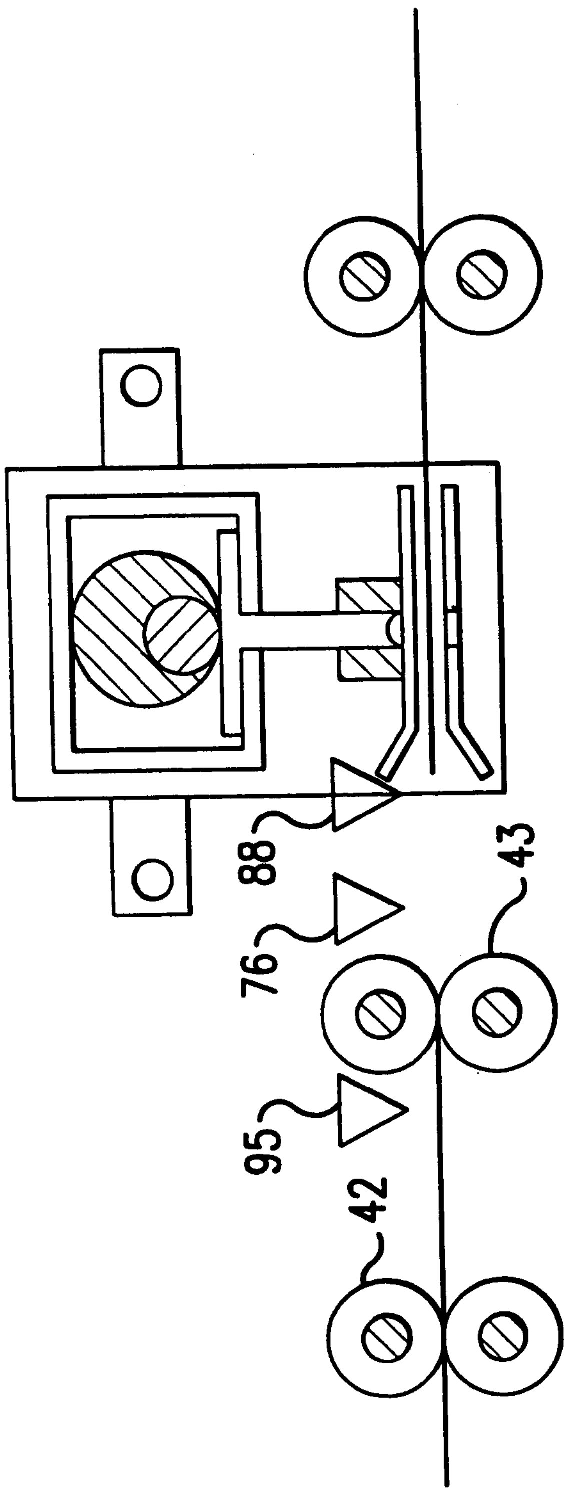
FIG. 18 is a sectional view to show the configuration the third embodiment of the punching system according to the invention.

FIGS. 17 and 18 show a punching system according to a third embodiment of the invention. Parts identical with or similar to those of the embodiment previously described are denoted by the same reference numerals. The punching system according to the third embodiment is applied to an image formation system of a so-called "side registration" system for forming an image with one axial end of a photosensitive drum 20 as the reference and transporting a sheet 41 of recording paper, etc., with one end in the width direction thereof as the reference for forming an image on the sheet, and moreover is applied, to a system with large variations in the width direction positions of the sheets 41 and small skew thereof. With the punching system, the center line position in the width direction of each sheet 41 varies depending on the size of sheet 41 and the variations in the width direction positions of sheets 41, thus the middle of punches 55 and 56 needs to be aligned with the center line of a sheet 41 of each size considering the variations in the width direction positions of sheets 41 before the sheet is punched.

Then, the punching system according to the third embodiment comprises move means for moving a punching system main unit 40 containing a punch section 50 and a die section 51 along the width direction of a sheet 41 in response to the sheet 41 size, etc., based on size information in the width direction of sheet 41 and information as to whether or not the sheet is to be punched, as in the second embodiment. In addition, it comprises two paper width direction end margin sensing sensors 90 and 91 being fixed to the punching system main unit 40 and moving in conjunction with the punching system main unit 40 for sensing the end margin in the width direction of a sheet 41.

Assuming that the maximum variation amount in width direction positions in a transport state of a sheet 41 in the image formation system is ±K, the punching system main unit 40 is placed at the home position so that the middle of punches 55 and 56 comes to a position shifted by K+$\alpha$ (where $\alpha$ is a margin) from the center line of a sheet 41 of the maximum size in the width direction at the normal position, as shown in FIG. 17. When the home position of the punching system main unit 40 is determined, margin a is taken for the following reason: When the end margin in the width direction of a sheet 41 is sensed by the paper width direction end margin sensing sensor 90, 91 while the punching system main unit 40 is being moved along the width direction of the sheet 41, if margin a does not exist, it is feared that the paper width direction end margin sensing sensor 90, 91 will sense the end margin in the width direction of the sheet 41 and that the punching system main unit 40 will stop before the move speed of the punching system main unit 40 becomes constant after a punch move motor 83 made of a stepping motor, etc., is started for starting a move of the punching system main unit 40. In this case, since the punching system main unit 40 is stopped before its move speed becomes constant, the punch move motor 83 is stopped, then the punching system main unit 40 actually stops. Thus, the move amount of the punching system main unit 40 because of inertia varies and the stop position of the punching system main unit 40 cannot accurately be controlled. Then, when the home position of the punching system main unit 40 is determined, margin $\alpha$ is taken, whereby the paper width direction end margin sensing sensor 90, 91 can sense the end margin in the width direction of the sheet 41 after the move speed of the punching system main unit 40 becomes constant, and the distance to actual stopping of the punching system main unit 40 due to inertia after the paper width direction end margin sensing sensor 90, 91 senses the end margin in the width direction of the sheet 41 and stops the punch move motor 83 can always be made constant.

The first paper width direction end margin sensing sensor 90 is placed at a distance of M1=(L1/2) along the width direction of the sheet 41 from the middle line of the punches 55 and 56. At this time, assume that the width of the maximum size of sheet 41 that can be punched (for example, the short length direction size of A3-size paper) is L1. The second paper width direction end margin sensing sensor 91 is placed at a distance of M2=(L2/2) from the middle line of the punches 55 and 56, where L2 is one paper width size smaller than the width of the maximum size, L1, (for example, the length direction size of B5-size paper). The size of sheet 41 sensed by the first paper width direction end margin sensing sensor 90 is set to the size of L1 or less and greater than L2. The size of sheet 41 sensed by the second paper width direction end margin sensing sensor 91 is set to the size of L2 or less.

A home position sensing sensor 93 is placed at a position for sensing an actuator 86 attached to the punching system main unit 40 when the punching system main unit 40 is at the home position (first standby position). Further, a second standby position sensing sensor 94 is placed at a position for sensing the actuator 86 attached to the punching system main unit 40 when the punching system main unit 40 moves by (L1/2–L2/2) from the home position. Placed upstream from a second transport roll pair 43 is a paper transport direction end margin sensing sensor 95 for sensing the end margin in the transport direction of a sheet 41 for the paper width direction end margin sensing sensor 90, 91 of the punching system main unit 40 to start the end margin sensing operation in the paper width direction.

When the width size provided by sheet size change information and a punching indication signal provided by punching execution information come, if the sheet 41 width size is longer than L2, the punching system main unit 40 stands by at the home position; if the sheet 41 width size is equal to or less than L2, the punching system main unit 40 stands by at the second standby position. If a no-punching indication signal comes according to punching execution information, the punching system main unit 40 stands by at the home position regardless of sheet size change information.

In the configuration, the punching system according to the third embodiment can punch sheets with large variations in width direction positions and small skew with good accuracy in the image formation system of the side registration system as follows:

If sheet 41 width size L3 smaller than L2 comes according to sheet size information and a punching indication signal comes according to punching execution information, before receiving the first sheet 41, the punching system main unit 40 moves from the home position shown in FIG. 17 to the second standby position (indicated by the broken line in the figure) at which the second standby position sensing sensor 94 senses the actuator 86. In this case, it is determined that the second paper width direction end margin sensing sensor 91 is used to sense the end margin of the sheet 41, and the distance to stopping of the punch move motor 83 after the second paper width direction end margin sensing sensor 91 senses the sheet end margin becomes (L2/2–L3/2) mm. Thus, the distance data is converted into the time, count, or the number of pulses for determining a controlled variable to move the punching system main unit 40.

The punching system main unit 40 moves to the second standby position at which the second standby position sensing sensor 94 senses the actuator 86, and once stops. It moves to the second standby position as soon as the width size of the sheet 41 to be punched is known according to the sheet size information. At the second standby position, at least as long distance as the margin is provided between the second paper width direction end margin sensing sensor 91 and the end margin in the width direction of the sheet 41 even if the sheet 41 has the maximum variation in the width direction position of –K. Then, when it is made possible for the second paper width direction end margin sensing sensor 91 to sense the end margin of the sheet 41 after the expiration of a predetermined time interval since the front end of the sheet 41 passed through the paper transport direction end margin sending sensor 95, the punching system main unit 40 again starts to move and the second paper width direction end margin sensing sensor 91 senses the end margin of the sheet 41. When the second paper width direction end margin sensing sensor 91 senses the end margin of the sheet 41, the punch move motor 83 is driven by distance equivalent to (L2/2–L3/2) mm and stops (the punching system main unit 40 is stopped). In this state, the middle of the punches 55 and 56 of the punching system main unit 40 matches the position at a distance of L3/2·mm from the end margin of the sheet 41, namely, the center in the width direction of the sheet 41 of the width size L3. Thus, the punching system main unit 40 punches the sheet 41 as in the first embodiment.

If the width direction size of sheet 41, L3', is larger than L2 and a punching indication signal comes according to punching execution information, before receiving the first sheet 41, the punching system main unit 40 moves to the home position. Further, it is determined that the paper width direction end margin sensing sensor 90 is used to sense the end margin of the sheet 41, and the distance to stopping of the punch move motor 83 after the paper width direction end margin sensing sensor 90 senses the end margin of the sheet 41 becomes (L2/2–L3/2) mm. Thus, the distance data is converted into the time, count, or the number of pulses for determining a controlled variable. Subsequently, the paper width direction end margin sensing sensor 90 senses the end margin of the sheet 41 and the punching system main unit 40 is stopped and punches the sheet 41 in a similar manner to that described above.

By the way, the timing at which the paper width direction end margin sensing sensor 90, 91 starts to sense the end margin of the sheet 41 under the above-described control is when the front end of the sheet 41 reaches the paper width direction end margin sensing sensor 90, 91 at the earliest.

Figure 19:
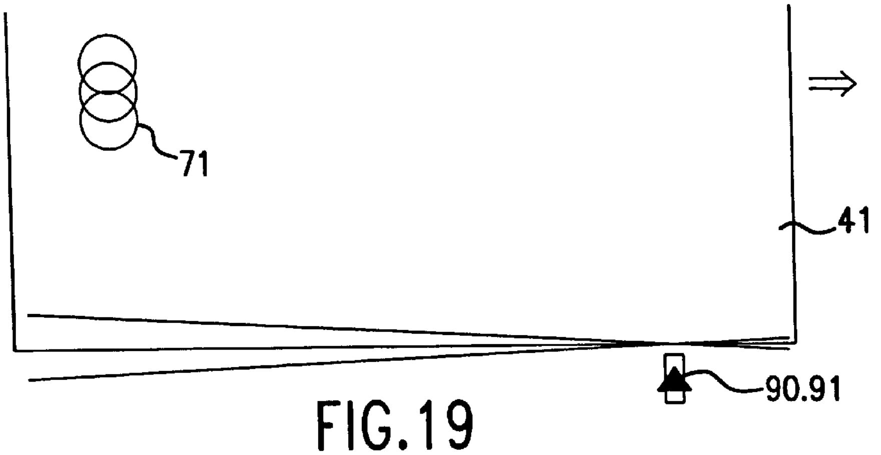
FIG. 19 is an illustration to show how a sheet is punched.
Figure 20:
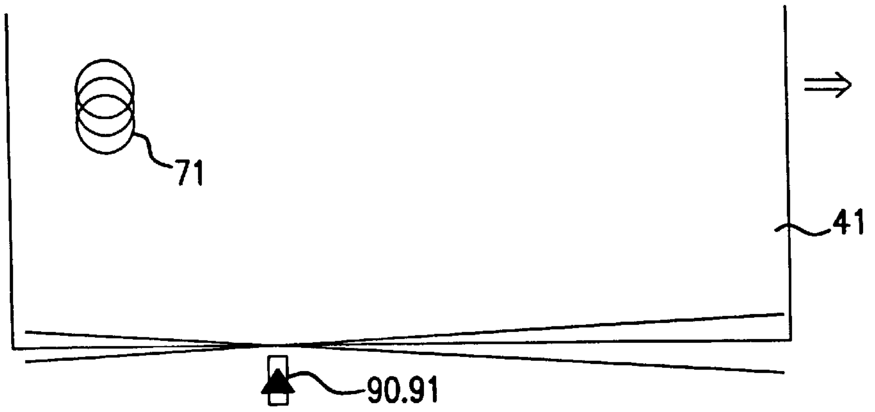
FIG. 20 is an illustration to show how a sheet is punched.
Figure 21:
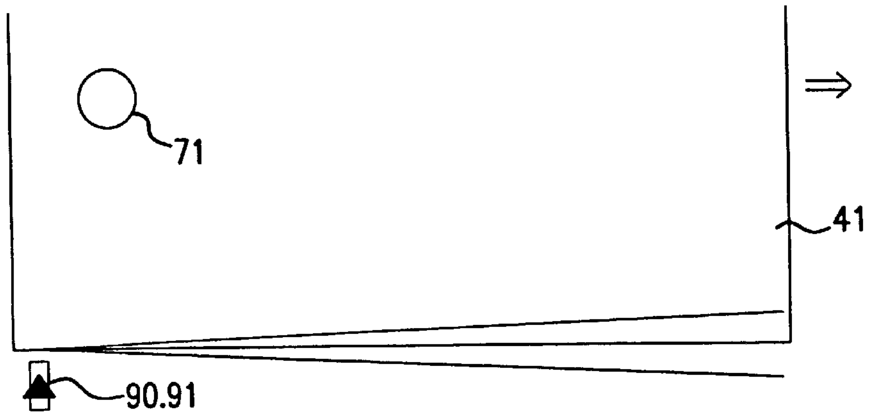
FIG. 21 is an illustration to show how a sheet is punched.

FIGS. 19 to 21 illustrate how the skew effect of sheet 41 appears if the position at which the paper width direction end margin sensing sensor 90, 91 senses the end margin of the sheet 41 is changed. To punch the rear end of the sheet 41, if the end margin in the paper transport direction is sensed in the vicinity of the front end of the sheet 41, as shown in FIG. 19, it Is feared that the skew effect of the sheet 41 may cause the position of a hole 70 at the rear end of the sheet to largely shift. Thus, if the end margin in the paper running direction is sensed in the vicinity of the rear end of the sheet 41 as much as possible, as shown in FIG. 21, rather than sensing the end margin in the paper transport direction in the vicinity of the front end of the sheet 41, the skew effect of the sheet 41 can be lessened and a hole can be punched in the sheet 41 with good accuracy. Thus, the paper width direction end margin sensing sensor 90, 91 may be placed at the rear end in the transport direction of the punching system main unit 40.

Since the punching system once stops the sheet 41 and then punches it, if the paper width direction end margin sensing sensor 90, 91 senses the end margin in the transport direction of the sheet 41 after the sheet 41 stops, the skew effect can be lessened. In this case, however, the time during which the sheet 41 is stopped is prolonged because of the time required for the punching and the time required for the sensing operation of the end margin in the paper transport direction (the time varies depending on the paper width size); with high-speed machines, the next sheet 41 is transported to the punching system main unit 40 and it is feared that a paper jam may occur or that the next sheet may also be punched.

Since the punching system shown in FIG. 6 punches a sheet 41 without stopping it, the end margin of the running sheet 41 must be sensed. If the paper transport direction end margin sensing sensor 95 senses the front end of the sheet 41 and the punching system main unit 40 starts the operation of sensing the end margin in the paper transport direction according to the sensing information and punches the rear end of the sheet 41, the time interval between the instant at which the front end of the sheet 41 is sensed and the instant at which the sheet 41 reaches the punching position varies depending on the size in the transport direction of the sheet 41.

Thus, in the third embodiment, to change the time between the paper transport direction end margin sensing sensor 95 sensing the front end of the sheet 41 and the paper width direction end margin sensing sensor 90, 91 starting the end margin sensing operation of the sheet 41 based on paper size information and punch the rear end of the sheet 41, the timing is controlled so that the paper width direction end margin sensing sensor 90, 91 performs the end margin sensing operation at a position near the rear end of the sheet 41 as much as possible, as shown in FIG. 21.

After the control is performed, the paper transport direction end margin sensing operation and punching and the return operation to the standby position as in the second embodiment are performed for each sheet 41.

By the way, unless the selected paper width direction end margin sensing sensor 90 or 91 senses the end margin in the width direction of a sheet 41 within a given time after starting the paper width direction end margin sensing operation, the sheet 41 is not punched and is discharged from the punching system main unit 40, because the variations in the width direction positions of sheets exceed a predetermined value for some reason and the paper width direction end margin sensing operation takes more time than was intended and it is feared that the punching system main unit 40 may exceed the movable distance and be stuck in some cases.

Then, if the paper width direction end margin sensing operation takes too much time in the punching system according to the third embodiment, it is feared that a paper jam may occur, that the next sheet may also be punched, or that punch hole positions in the punching system may shift for the above-described reason. Thus, such sheets 41 are not punched and are discharged from the punching system. If a width direction end margin sensing failure of the sheet 41 occurs, a message to the effect that the sheet cannot be punched is displayed on an operation panel of the image formation system.

As in the above-described embodiment, a paper transport direction end margin sensing sensor 76 is fixedly placed between the center line of the maximum size of a sheet that can be punched and the center line of the minimum size of a sheet that can be punched in order to lessen the skew effect on sheets of all sizes that can be punched. When the paper transport direction end margin sensing sensor 76 is placed at a position of the middle of the two punches 55 and 56, the best accuracy is provided, as described above. Then, also in the third embodiment, a paper transport direction end margin sensing sensor 88 is attached integrally at a position on a sheet transport passage at the middle of the two punches 55 and 56 of the punching system main unit 40 and is associated with a move of the punching system main unit 40. Since the middle of the punching edges 55 and 56 always matches the center line of a sheet 41 of each width size at each standby position, the skew effect can be lessened as much as possible for punching the sheet. The paper transport direction end margin sensing sensors 76 and 88 can be used appropriately as required.

Thus, in the third embodiment, if the image formation system is of a side registration system and moreover has large variations in width direction positions of sheets and small skew thereof, either the paper width direction end margin sensing sensor 90 or 91 can actually sense the end margin of a sheet 41 that can vary in the width direction position and the punching system main unit 40 can be moved to a proper position for punching the sheet, so that accurate punching can always be performed. Moreover, the paper width direction end margin sensing sensor 90 or 91 is attached to the punching system main unit 40 and moves along the width direction of a sheet 41 in conjunction with the punching system main unit 40, so that it is simply configured and can sense the end margin of a sheet 41 with good accuracy. Thus, it is not necessary to fixedly place a plurality of paper width direction end margin sensing sensors densely, and the punching system can be brought down in cost.

In the third embodiment, the punching system main unit 40 previously moves to a predetermined standby position in response to the width information of a sheet 41 before the paper width direction end margin sensing sensor 90 or 91 senses the end margin of the sheet 41 and the punches 55 and 56 are aligned with the sheet 41. Thus, if the sheet size is changed, the time required by the time punching is enabled is short and proper punching can be executed in a short time; the punching system can also be applied to high-speed image formation systems.

In the third embodiment, the paper width direction end margin sensing sensors 90 and 91 are placed, either of which is selected in response to the size information in the width direction of a sheet 41 and senses the end margin in the width direction of the sheet 41 for punching under the condition determined for each sheet 41. However, the invention is not limited to the configuration. Of course, only one sheet width direction end margin sensing means may be placed and the time to stopping of the move means of the punching mechanism after the sheet width direction end margin sensing means senses the end margin in the width direction of a sheet material in response to the size information in the width direction of the sheet material may be determined, then punching may be executed under the condition determined for each sheet material.

Embodiment Four

Figure 22:
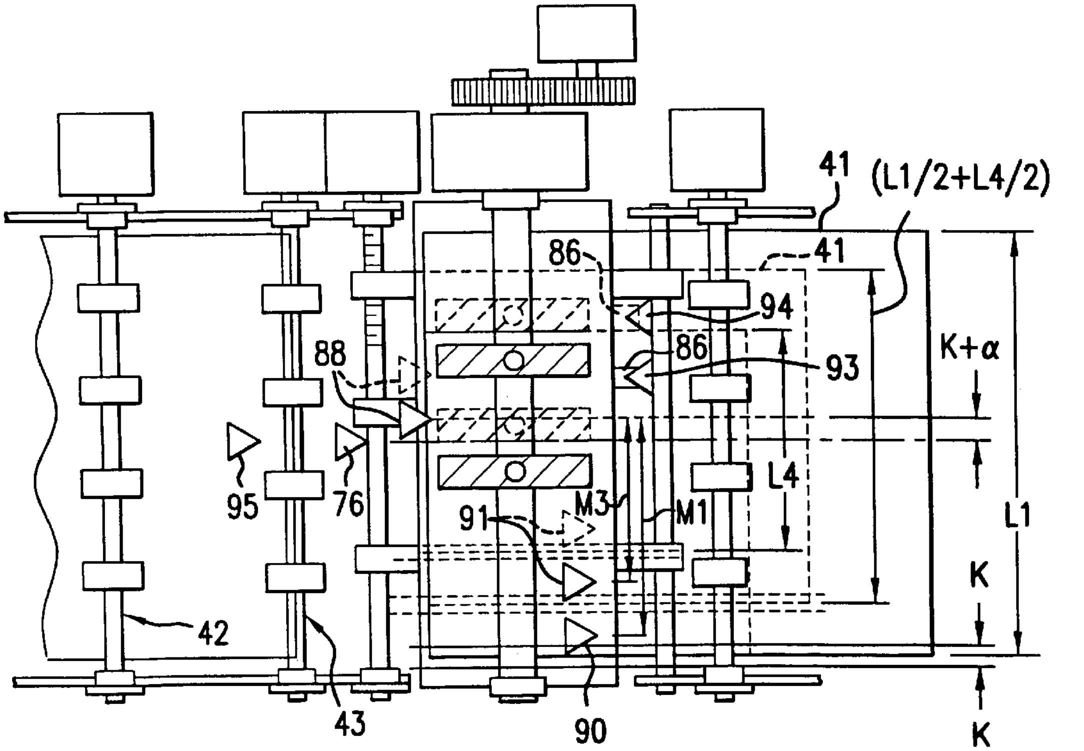
FIG. 22 is a plan view to show the configuration of a fourth embodiment of a punching system according to the invention.
Figure 23:
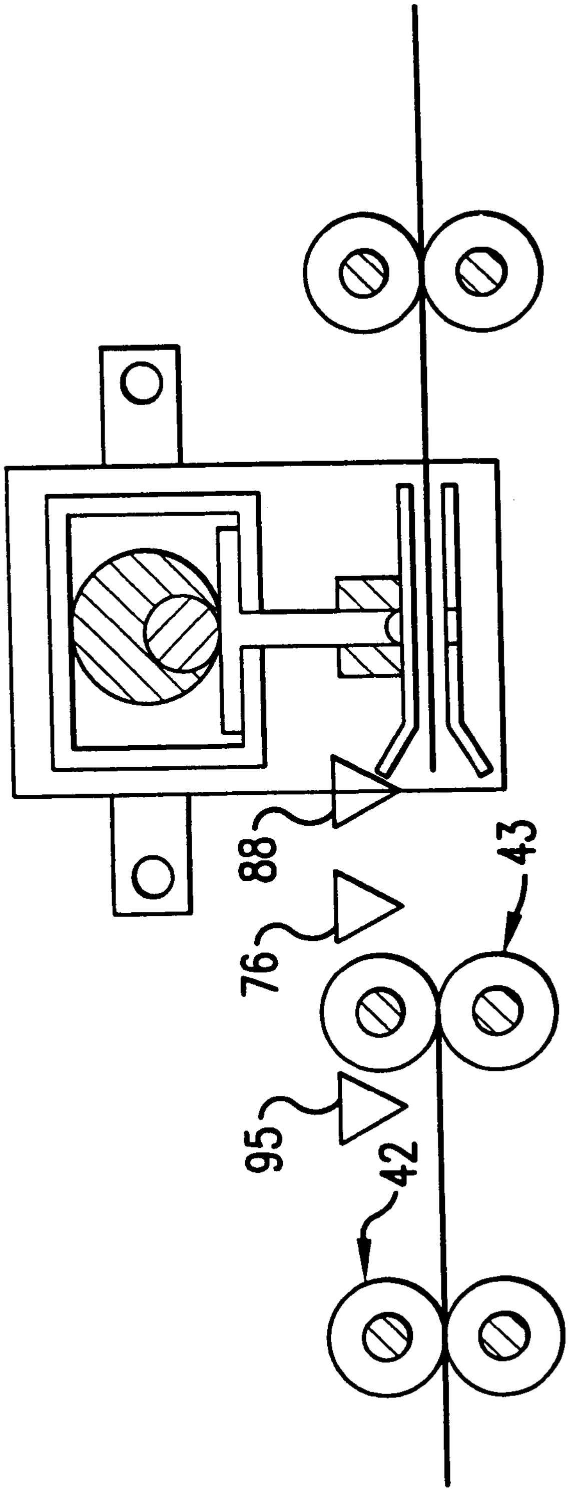
FIG. 23 is a sectional view to show the configuration of the fourth embodiment of the punching system according to the invention.

FIGS. 22 and 23 show a punching system according to a fourth embodiment of the invention. Parts identical with or similar to those of the embodiment previously described are denoted by the same reference numerals. The punching system according to the fourth embodiment is applied to an image formation system of a so-called "center registration" system for forming an image with the axial center of a photosensitive drum 20 as the reference and transporting a sheet 41 of recording paper, etc., with the center in the width direction thereof as the reference for forming an image on the sheet, and moreover is applied to a system with large variations in the width direction positions of the sheets 41 and small skew thereof. With the punching system, the center line position in the width direction of each sheet 41 varies depending on the variations In the width direction positions of sheets 41, thus the middle of punches 55 and 56 needs to be aligned with the center line of the sheet 41 considering the variations in the width direction positions of sheets 41 before the sheet is punched.

Then, the punching system according to the fourth embodiment comprises move means for moving a punching system main unit 40 containing a punch section 50 and a die section 51 along the width direction of a sheet 41 in response to the sheet 41 size, etch, based on size information in the width direction of sheet 41 and information as to whether or not the sheet is to be punched, as in the third embodiment. In additions it comprises two paper width direction end margin sensing censors 90 and 91 being fixed to the punching system main unit 40 and moving in conjunction with the punching system main unit 40 for sensing the end margin in the width direction of a sheet 41.

Assuming that the maximum variation amount in width direction positions in a transport state of a sheet 41 in the image formation system is K, the punching system main unit 40 is placed at the home position so that the middle of punching edges 55 and 56 comes to a position shifted by K+α (where α is a margin) from the center line of a sheet 41 of the maximum size in the width direction at the normal position, as shown in FIG. 22. The first paper width direction and margin sensing sensor 90 is placed at a distance of M1=(L1/2) along the width direction of the sheet 41 from the middle line of the punches 55 and 56. At this time, assume that the width of the maximum size of sheet 41 that can be punched (for example, the short length direction size of A3-size paper) is L1. Assuming that the width of the minimum size of paper that can be punched is L4, the second paper width direction end margin sensing sensor 91 is placed at the middle position of the end margin of the maximum size of paper that can be punched and the end margin of the minimum size of paper that can be punched, M3 =(L1/4+ L4/4). The size of sheet sensed by the first paper width direction end margin sensing sensor 90 is set to the size of L1 or less and greater than (L1/2+L4/2). The size of sheet sensed by the second paper width direction end margin sensing sensor 91 is set to (L1/2+L4/2) or less. A paper transport direction end margin sensing sensor 88 is placed at a position corresponding to the middle of the punches 55 and 56. With this position as a home position (first standby position), a home position sensing sensor 93 senses an actuator 86 of the punching system main unit 40 at the home position. Further, a second standby position sensing sensor 94 is placed at a second standby position at a distance of (L1/4+L4/42) from the home position sensing sensor 93. Placed upstream from a second transport roll pair 43 is a paper transport direction end margin sensing sensor 95 to start the paper transport direction end margin sensing operation of the punching system.

In the configuration, the punching system according to the fourth embodiment can transport sheets with the center in the width direction as the reference and punch sheets with large variations in width direction positions and small skew is with good accuracy as follows:

If a width size is provided by sheet size change information and a punching indication signal is provided by punching execution information, if the width size of sheet 41 is L1 or (L1/2+L4/2), the punching system main unit 40 stands by at the home position; otherwise, the punching system main unit 40 stands by at the second standby position. It a no-punching indication signal is provided by punching execution information, the punching system main unit 40 stands by at the home position regardless of the sheet size change information.

Next, if the width size is $$L3=((L1/2+L4/2)<L3<L1)$$

according to sheet size information and a punching indication signal comes according to punching execution information, before receiving the first sheet 41, the punching system main unit 40 moves from the home position to the position at which the standby position sensing sensor 94 senses the actuator 86. It is determined that the paper width direction end margin sensing sensor 90 is used to sense the end margin in the width direction of the sheet 41, and the distance to stopping of a punch move motor 83 after the paper width direction end margin sensing sensor 90 senses the end margin of the sheet 41 becomes (L1/2−L3/2) mm. Thus, the distance data is converted into the time, count, or the number of pulses for determining a controlled variable.

If the width size L3 is L3<(L1/2+L4/2) according to sheet size information and a punching indication signal comes according to punching execution information, before receiving the first sheet 41, the punching system main unit 40 moves from the home position until the standby position sensing sensor 94 is sensed. It is determined that the paper width direction end margin sensing sensor 90 is used to sense the end margin, and the distance to stopping of the punch move motor 83 after sensing is ((L1/2+L4/2)/2−L3/2) mm. Thus, the distance data is converted into the time, count, or the number of pulses for determining a controlled variable.

If the width size L3 equals L1 according to sheet size information and a punching indication signal comes according to punching execution information, before receiving the first sheet 41, the punching system main unit 40 moves to the home position. It is determined that the paper width direction end margin sensing sensor 90 is used to sense the end margin, and the distance to stopping of the punch move motor 83 after sensing is 0 mm. Thus, the punching system main unit 40 is stopped immediately after sensing.

If the width size L3 is L3=(L1/2+L4/2) according to sheet size information and a punching indication signal comes according to punching execution information, before receiving the first sheet 41, the punching system main unit 40 moves to the home position. It is determined that the paper width direction end margin sensing sensor 91 is used to sense the end margin, and the distance to stopping of the punch move motor 83 after sensing is 0 mm. Thus the punching system main unit 40 is stopped immediately after sensing.

Other operation is the same as in the third embodiment and will not be discussed again.

A paper transport direction end margin sensing sensor 76 is fixed almost at the center in the width direction of sheet 41. The best accuracy is provided if the paper transport direction end margin sensing sensor 76 is fixed to the punching system main unit 40 on a paper transport passage positioned at the middle of the punches 55 and 56 and is associated with a move of the punching system main unit 40, because a paper transport direction end margin sensing sensor 68 always matches the center of each sheet width size when sensing the end margin in the paper transport direction, as described above.

Embodiment Five

Figure 24:
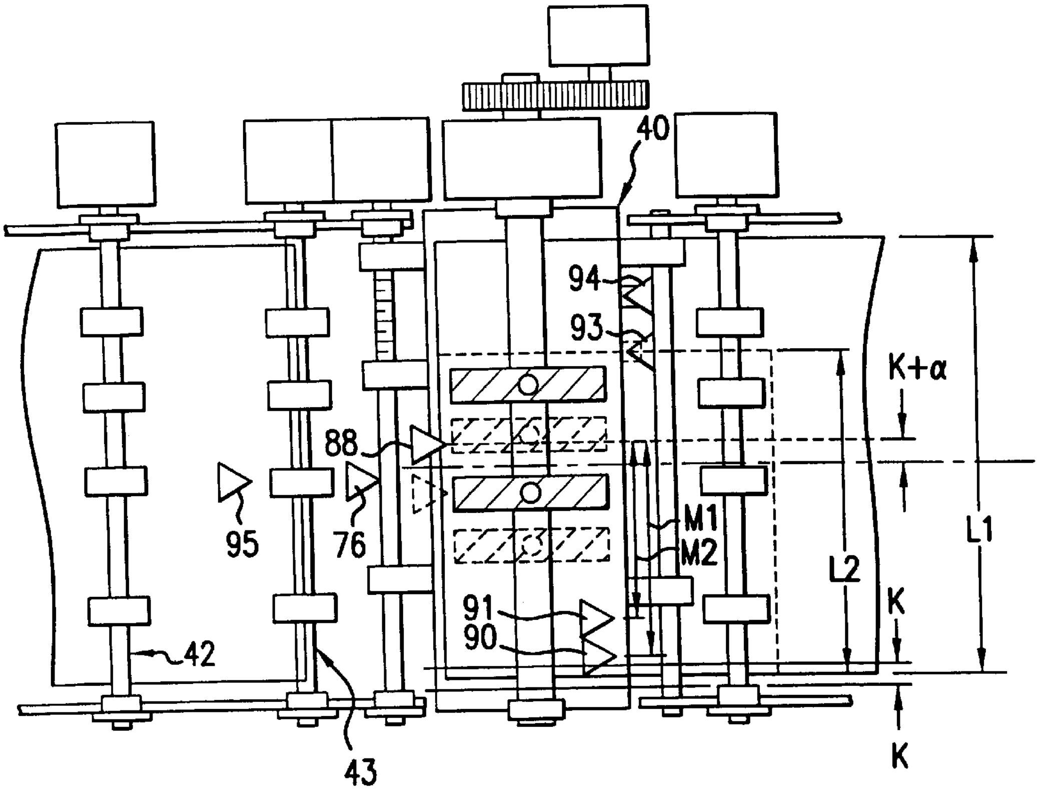
FIG. 24 is a plan view to show the configuration of a fifth embodiment of a punching system according to the invention.
Figure 25:
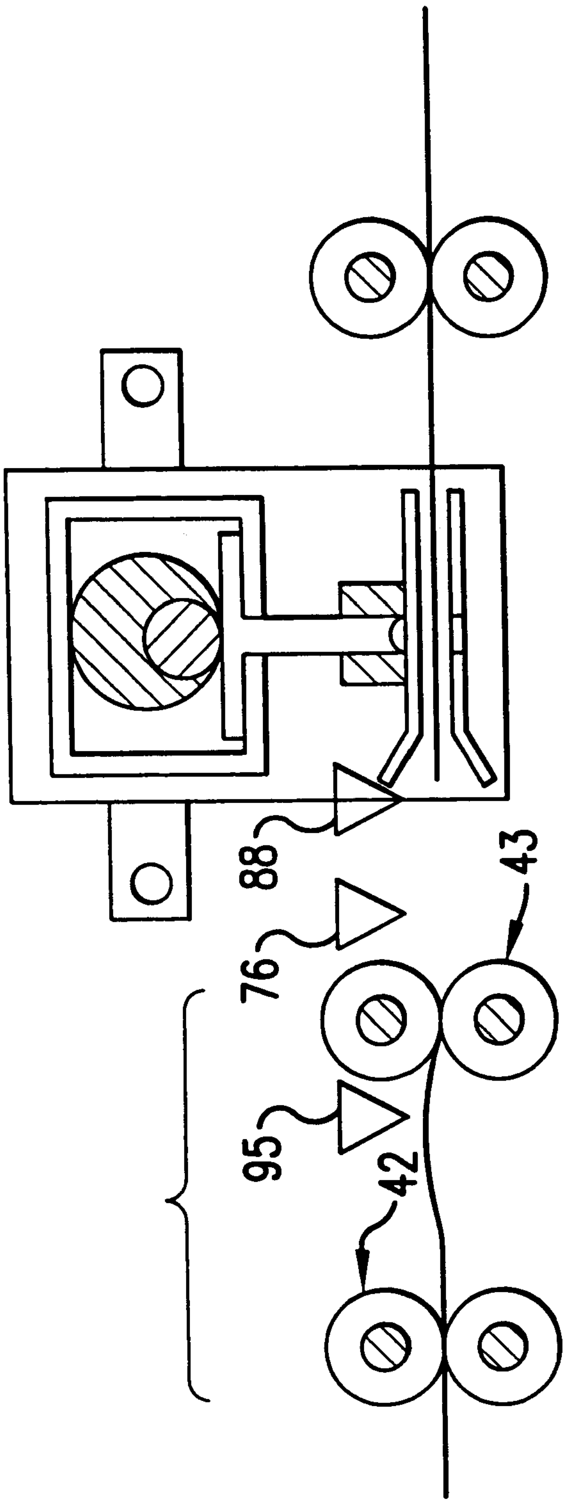
FIG. 25 is a sectional view to show the configuration of the fifth embodiment of the punching system according to the invention.

FIGS. 24 and 25 show a punching system according to a fifth embodiment of the invention. Parts identical with or similar to those of the embodiment previously described are denoted by the same reference numerals. The punching system according to the fifth embodiment is applied to an image formation system of a so-called "side registration" system for forming an image with one axial end of a photosensitive drum 20 as the reference and transporting a sheet 41 of recording paper, etc., with one end in the width direction thereof as the reference for forming an image on the sheet, and moreover is applied to a system with large variations in the width direction positions of the sheets 41 and large skew thereof. Since the punching system has large skew of sheets 41, first skew of each sheet 41 needs to be corrected. Then, since the center line position in the width direction of each sheet 41 varies depending on the size of sheet 41 and the variations in the width direction positions of sheets 41, the middle of punching edges 55 and 56 needs to be aligned with the center line of a sheet 41 of each size considering the variations in the width direction positions of sheets 41 before the sheet is punched.

Then, the punching system according to the fifth embodiment comprises move means for moving a punching system main unit 40 containing a punch section 50 and a die section 51 along the width direction of a sheet 41 in response to the sheet 41 size, etc. based on size information in the width direction of sheet 41 and information as to whether or not the sheet is to be punched, as in the third embodiment. In addition, it comprises two paper width direction end margin sensing sensors 90 and 91 being fixed to the punching system main unit 40 and moving in conjunction with the punching system main unit 40 for sensing the end margin in the width direction of a sheet 41. Further, the punching system is adapted to correct skew of a sheet 41 before the sheet 41 arrives at the punching system main unit 40.

As shown in FIGS. 24 and 25, a skew correction device is adopted for once stopping a second transport roll pair 43 and stopping a first transport roll pair 42 in a state in which the front end of a sheet 41 transported by means of the first transport roll pair 42 is struck against the second transport roll pair 43, thereby correcting skew of the sheet 41 so that the front end of the sheet 41 becomes parallel with the second transport roll pair 42. If rotation of the second transport roll pair 43 is started in a predetermined time after a paper transport direction end margin sensing sensor 95 senses the front end of the sheet 41, skew of the sheet 41 passing through the second transport roll pair 43 is corrected. In the fifth embodiment, the skew correction device is combined with the punching system of the third embodiment and the sheet 41 whose skew has been corrected is registered by sensing the end margin in the paper width direction, thereby eliminating the effect of skew and position shift in the width direction on the punch hole accuracy.

Embodiment Six

Figure 26:
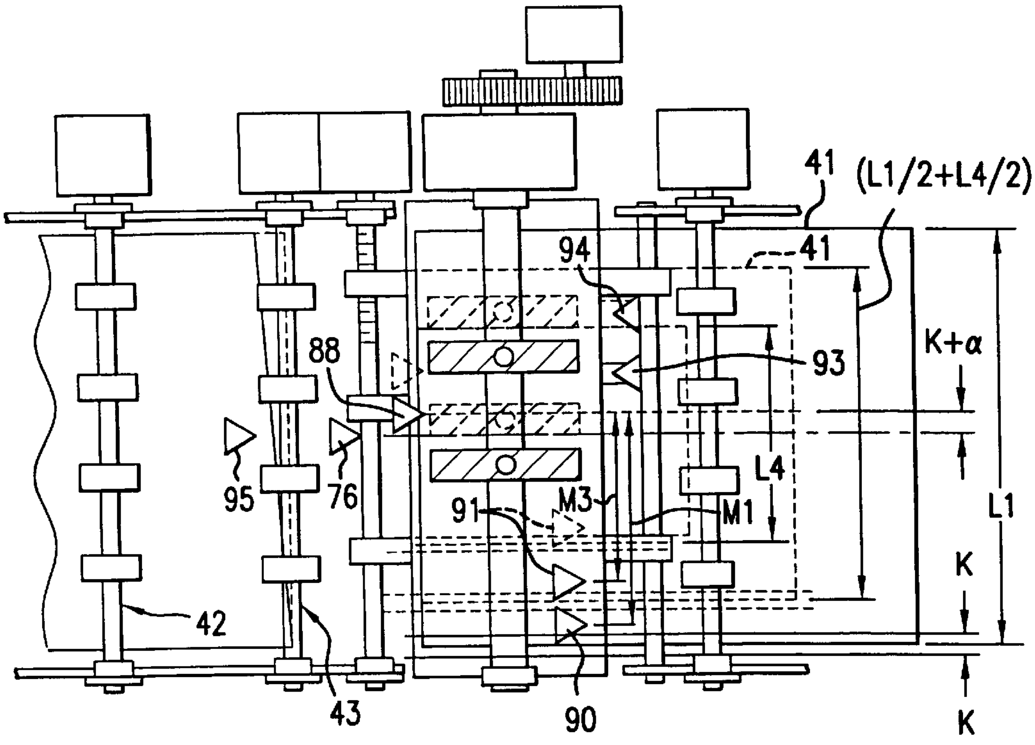
FIG. 26 is a plan view to show the configuration of a sixth embodiment of a punching system according to the invention.
Figure 27:
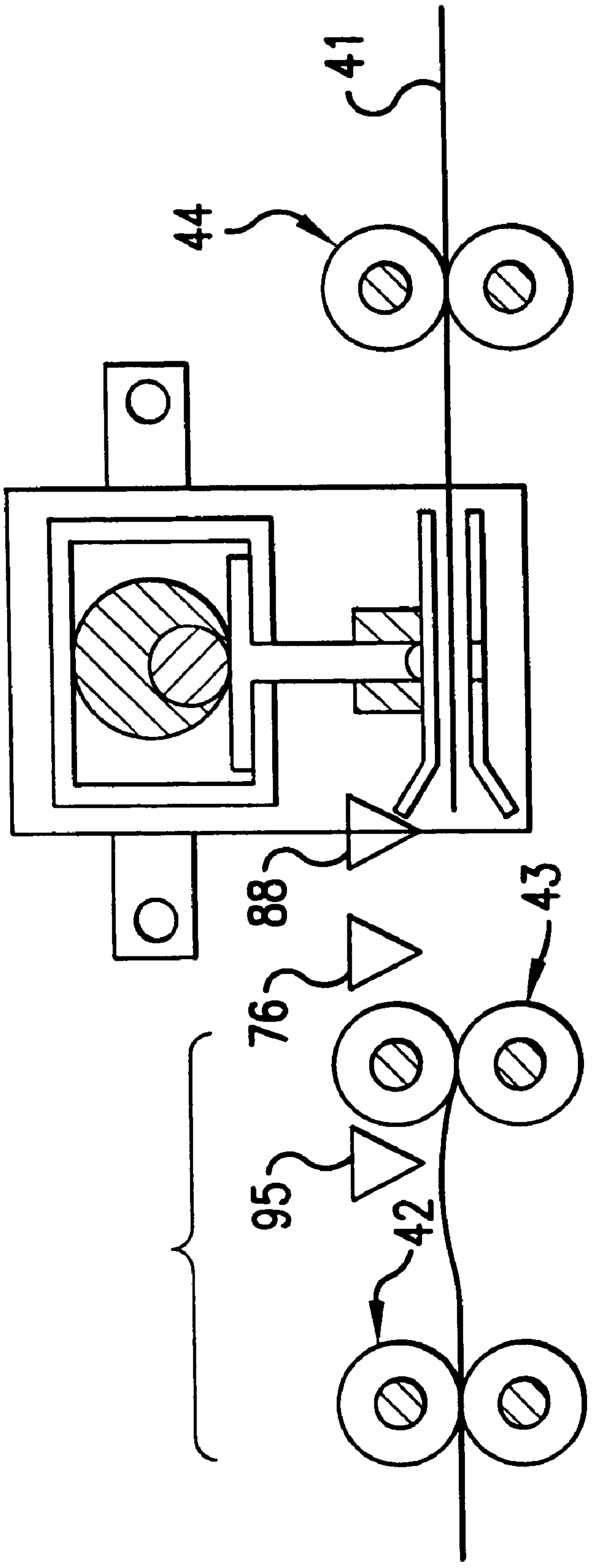
FIG. 27 is a sectional view to show the configuration of the sixth embodiment of the punching system according to the invention.

FIGS. 26 and 27 show a punching system according to a sixth embodiment of the invention. Parts identical with or similar to those of the embodiment previously described are denoted by the same reference numerals. The punching system according to the sixth embodiment is applied to an image formation system of a so-called "center registration" system for forming an image with the axial center of a photosensitive drum 20 as the reference and transporting a sheet 41 of recording paper, etc., with the center in the width direction thereof as the reference for forming an image on the sheet, and moreover is applied to a system with large variations in the width direction positions of the sheets 41 and large skew thereof. Since the punching system has large skew of sheets 41, first skew of each sheet 41 needs to be corrected. Then, since the center line position in the width direction of each sheet 41 varies depending on the variations in the width direction positions of sheets 41, the middle of punches 55 and 56 needs to be aligned with the center line of the sheet 41 considering the variations in the width direction positions of sheets 41 before the sheet is punched.

Then, the punching system according to the sixth embodiment comprises move means for moving a punching system main unit 40 containing a punch section 50 and a die section 51 along the width direction of a sheet 41 in response to the sheet 41 size, etc., based on size information in the width direction of sheet 41 and information as to whether or not the sheet is to be punched, as in the third embodiment. In addition, it comprises two paper width direction end margin sending sensors 90 and 91 being fixed to the punching system main unit 40 and moving in conjunction with the punching system main unit 40 for sensing the end margin in the width direction of a sheet 41. Further, the punching system is adapted to correct skew of a sheet 41 before the sheet 41 arrives at the punching system main unit 40.

As shown in FIGS. 26 and 27, a skew correction device configured like that of the punching system according to the fifth embodiment can be used.

Other components and functions of the sixth embodiment are the same as those of the fifth embodiment and therefore will not be discussed again.

As we have discussed, according to the invention, the punching system can move the punching mechanism by the move means in response to the size in the width direction of a sheet material for always punching holes in the center in the width direction of the sheet material with good accuracy even if an image formation system to which the punching system is applied adopts the so-called side registration system.

The punching system according to the first aspect of the invention, etc., is adapted to previously move the punching mechanism to a predetermined standby position based on the size information and punching execution information of a sheet material. Thus, if the sheet material size is changed, a move of the punching mechanism can be completed in a short time and the punching system can also be applied to high-speed image formation systems. Moreover, if the punching system does not punch a sheet material, the punching mechanism is immediately moved to the standby position for a sheet material of the maximum size in the width direction and is made to stand by at the position. Thus if a sheet material of a large size in the is width direction is transported after a sheet material of a small size in the width direction is punched, the sheet material can be reliably prevented from being caught in the coupling member of the punching mechanism and a paper jam can be reliably prevented from occurring.

The punching system according to the second aspect of the invention, etc., comprises the first sensing means placed on the sheet transport passage corresponding to the position between or at the middle of the punches. Thus, if sheet materials have slight variations in the width direction positions or slight skew, a punch hole position shift can be suppressed to the degree to which it scarcely becomes a problem.

The punching system according to the eleventh aspect of the invention, etc., is applied to an image formation system of the side registration system, for example. Any of a plurality of second sensing means actually senses the end margin of a sheet material that can vary in width direction position, and the punching mechanism can be moved to an appropriate position for punching the sheet material, thus the punching system can always punch sheet materials with good accuracy. Moreover, the second sensing means, which moves along the width direction of a sheet material in conjunction with the punching mechanism, has a simple configuration and can sense the end margin of a sheet material with good accuracy. Therefore, it is not necessary to fixedly place a plurality of second sensing means densely, and the punching system can be brought down in cost.

In the punching system according to the eleventh aspect of the invention, etc., the punching mechanism previously moves to a predetermined standby position in response to the width information of a sheet material before the second sensing means senses the end margin of a sheet material and the punches are aligned with the sheet material. Thus, if the sheet size is changed, the time required by the time punching is enabled is short and proper punching can be executed in a short time; the punching system can also be applied to high-speed image formation systems.

The punching system according to the nineteenth aspect of the invention further includes means for correcting the transport attitude of a sheet material. Thus, if a sheet material has large skew, the punching system can correct the skew and punch the sheet material; it can always punch sheet materials with good accuracy.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modification as are suited to the particular use contemplated. It is intended that the scope of the invention be defined by the claims appended hereto, and their equivalents.

What is claimed is:

1. A punching system for punching holes in a sheet material being transported, said punching system comprising:

a sheet transport means for transporting the sheet material;

a driver for driving said sheet transport means;

a punching mechanism including a plurality of punches disposed on a transport passage of the sheet material in a predetermined spacing in a direction orthogonal to a transport direction of the sheet material and operative to punch a plurality of holes in the sheet material in the predetermined spacing along a width direction of the sheet material; and first sensing means disposed on the transport passage of the sheet material positioned in the width direction between two adjacent punches for sensing either a beginning or an end margin in the transport direction of the sheet material transported to the punching mechanism, wherein the punching mechanism is operated based on sensing information output from the first sensing means in a sheet material stop state where said driver stops the driving of said sheet transport means a given period of time after said first sensing means detects either the beginning or the end margin in the transport direction of the sheet material to stop the sheet material once, thereby punching a plurality of holes at a predetermined distance from either of a selected beginning or end margin in the transport direction of the sheet material irrespective of a thickness of the sheet material.

2. The punching system as claimed in claim 1 wherein the first sensing means is placed in a substantial center in the width direction of the sheet material.

3. The punching system as claimed in claim 1 wherein the first sensing means is placed between a center of a sheet material of a maximum width that can be punched and a center of a sheet material of a minimum width that can be punched.

4. The punching system as claimed in claim 1 further including control means for punching the sheet material so that a distance between the end margin in the transport direction of the sheet material and the plurality of punch holes becomes constant based on the sensing information output from the first sensing means.

5. The punching system as claimed in claim 4 wherein the distance between the end margin in the transport direction of the sheet material and the plurality of punch holes can be changed by changing a parameter containing any of a time interval between the instant at which the first sensing means senses the end margin in the transport direction of the sheet material and the instant at which the punching is started, a number of pulses when a step motor is used to transport the sheet material, or a rotation angle of a transport shaft for transporting the sheet material in order to make the distance constant.

6. The punching system as claimed in claim 5 further comprising means for inputting distance data between the end margin in the transport direction of the sheet material and the plurality of punch holes and operation means for converting the distance data input through the input means into the parameter of any of the time, the number of pulses, or the rotation angle, wherein based on the parameter of any of the time, the number of pulses, or the rotation angle, the punching is started or a sheet material transport means is stopped after the end margin in the transport direction of the sheet material is sensed.

7. A punching system as claimed in claim 1, wherein the first sensing means is disposed at an upstream location in the transport direction from the plurality of punches.

* * * * *